(12) United States Patent
Guyer

(10) Patent No.: US 8,074,985 B2
(45) Date of Patent: *Dec. 13, 2011

(54) VIRTUAL GAME

(75) Inventor: Reynolds Guyer, Boca Grande, FL (US)

(73) Assignee: Winsor Concepts, St. Paul, MN (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/056,957

(22) Filed: Mar. 27, 2008

(65) Prior Publication Data

US 2011/0151962 A9    Jun. 23, 2011

Related U.S. Application Data

(63) Continuation-in-part of application No. 10/928,459, filed on Aug. 27, 2004, now Pat. No. 7,401,781.

(60) Provisional application No. 60/920,441, filed on Mar. 28, 2007.

(51) Int. Cl.
    A63F 9/04         (2006.01)
(52) U.S. Cl. ........................................ 273/146
(58) Field of Classification Search .................. None
    See application file for complete search history.

(56) References Cited

U.S. PATENT DOCUMENTS

| 817,233 | A | * | 4/1906 | Emmerling | 273/260 |
|---|---|---|---|---|---|
| 882,945 | A | | 3/1908 | Hurst | |
| 1,584,316 | A | | 5/1926 | Mayhew | |
| 2,044,122 | A | | 6/1936 | Michener | 273/134 |
| 3,445,115 | A | * | 5/1969 | William | 273/243 |
| 3,608,902 | A | * | 9/1971 | Weisbecker | 273/248 |
| 3,642,286 | A | * | 2/1972 | Moore | 273/243 |
| 3,747,935 | A | | 7/1973 | Engelbrecht | 273/138 |
| 3,929,337 | A | * | 12/1975 | Hayes | 273/243 |
| 4,469,329 | A | * | 9/1984 | Guyer | 273/146 |
| 4,648,602 | A | | 3/1987 | Maroney | 273/146 |
| 4,834,386 | A | * | 5/1989 | Rosenthal et al. | 273/146 |
| 4,930,780 | A | * | 6/1990 | Goodman et al. | 273/146 |
| 4,961,581 | A | * | 10/1990 | Barnes et al. | 273/236 |
| 5,080,370 | A | | 1/1992 | Lu | 273/260 |
| 5,114,147 | A | * | 5/1992 | Faylo | 273/146 |
| 5,364,101 | A | * | 11/1994 | Spooner et al. | 273/146 |
| 5,405,145 | A | * | 4/1995 | Jones et al. | 273/146 |
| 5,649,704 | A | | 7/1997 | Dobbin | 273/268 |
| 6,120,377 | A | * | 9/2000 | McGinnis et al. | 463/20 |
| 6,209,870 | B1 | * | 4/2001 | Shea et al. | 273/146 |
| 6,299,166 | B1 | | 10/2001 | Factor | 273/146 |

(Continued)

FOREIGN PATENT DOCUMENTS

FR           1432719           6/1966

OTHER PUBLICATIONS

Supplemental EPO Search Report for PCT/US2004028140 dated Aug. 27, 2007 from the European Patent Office, 4 pages.

(Continued)

*Primary Examiner* — Alvin Hunter
*Assistant Examiner* — Dolores Collins
(74) *Attorney, Agent, or Firm* — Westman, Champlin & Kelly

(57) ABSTRACT

A gaming method includes repetitive plays simulating rolls of virtual dice by a player and at least one of a bonus feature and a progressive feature. A gaming method includes scoring dice.

14 Claims, 27 Drawing Sheets

U.S. PATENT DOCUMENTS

| | | | | |
|---|---|---|---|---|
| 6,386,973 | B1 * | 5/2002 | Yoseloff | 463/13 |
| 6,746,328 | B2 * | 6/2004 | Cannon et al. | 463/17 |
| 6,997,803 | B2 * | 2/2006 | LeMay et al. | 463/20 |
| 7,017,905 | B2 * | 3/2006 | Lindsey | 273/146 |
| 7,090,579 | B2 * | 8/2006 | Tarantino | 463/20 |
| 7,118,107 | B2 * | 10/2006 | Niedner et al. | 273/236 |
| 7,334,792 | B1 * | 2/2008 | Bermann | 273/146 |
| 7,401,781 | B2 * | 7/2008 | Guyer et al. | 273/146 |

OTHER PUBLICATIONS

Bunco Rules, The Rules of Bunco, 5 pages, Aug. 2, 2004.

* cited by examiner

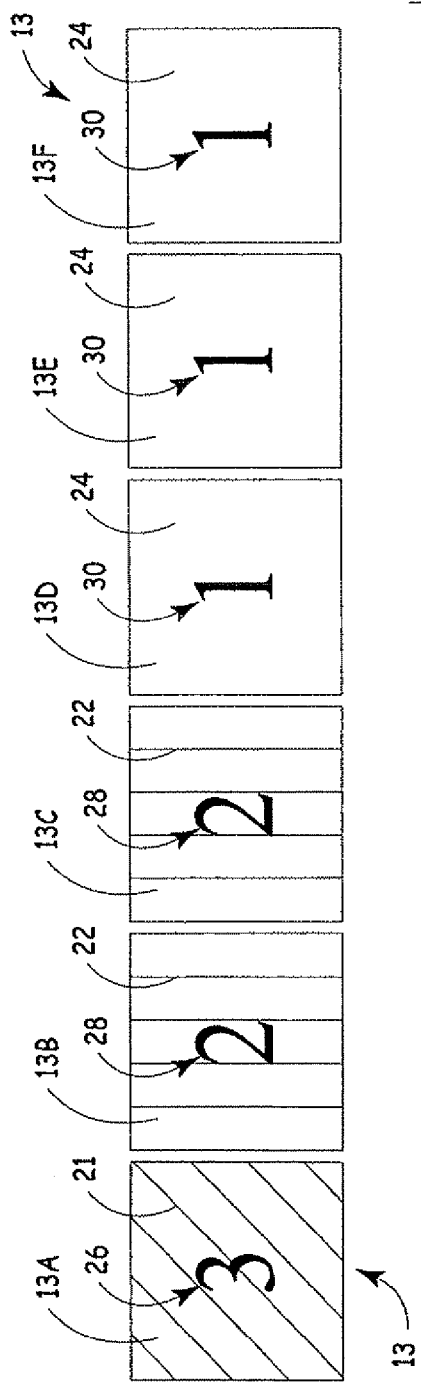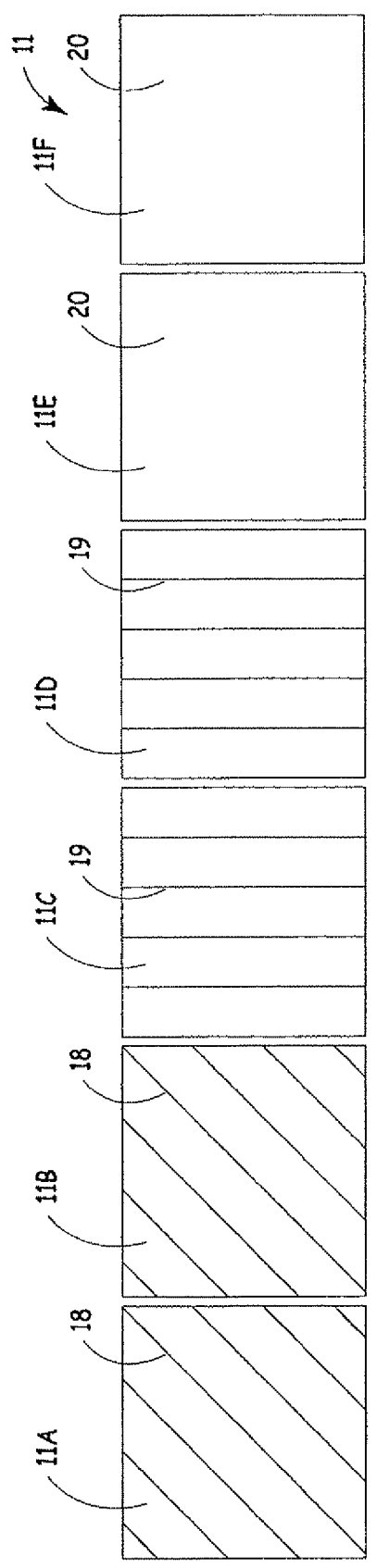

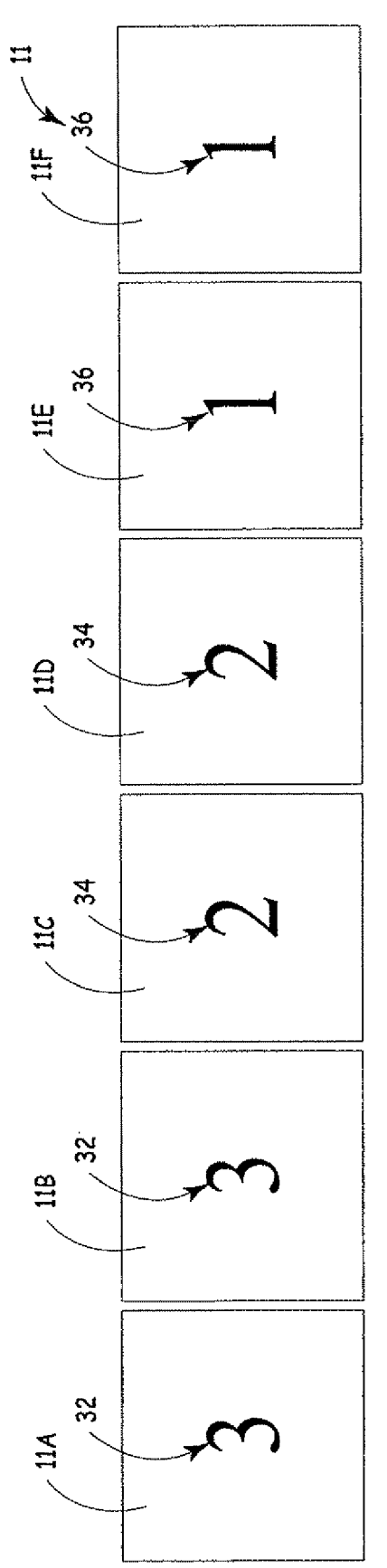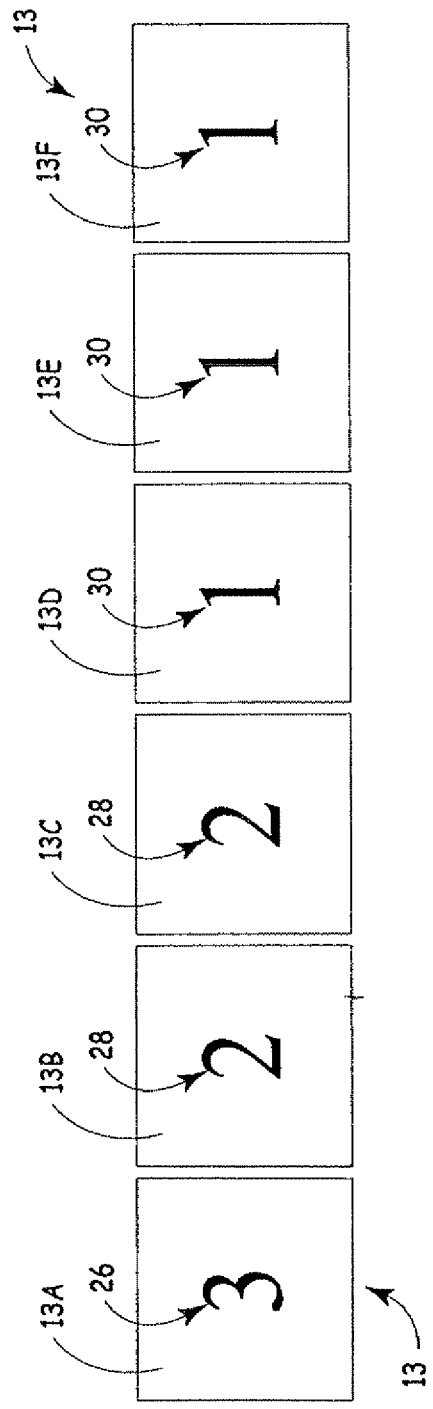

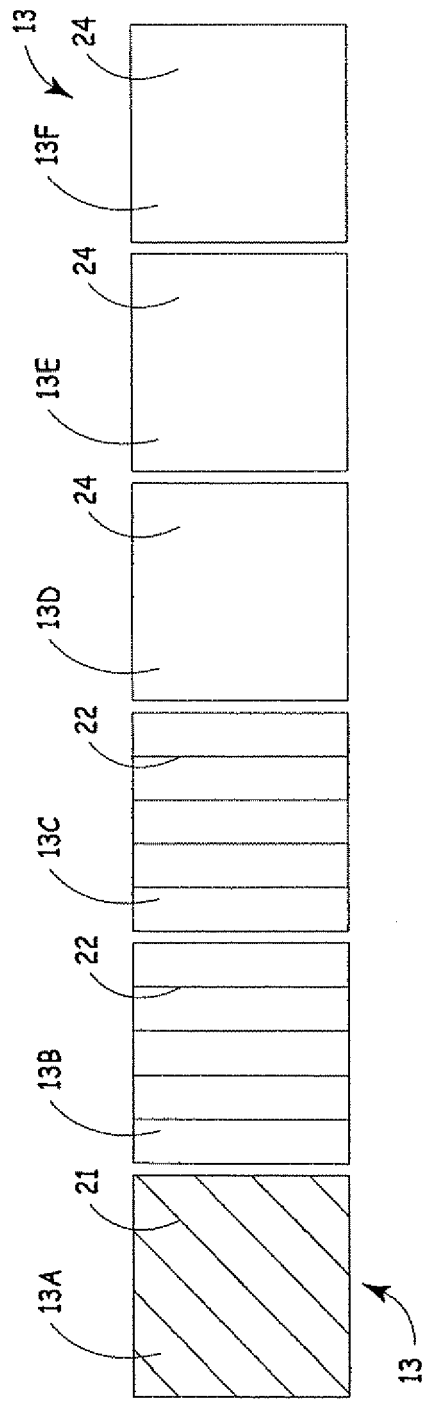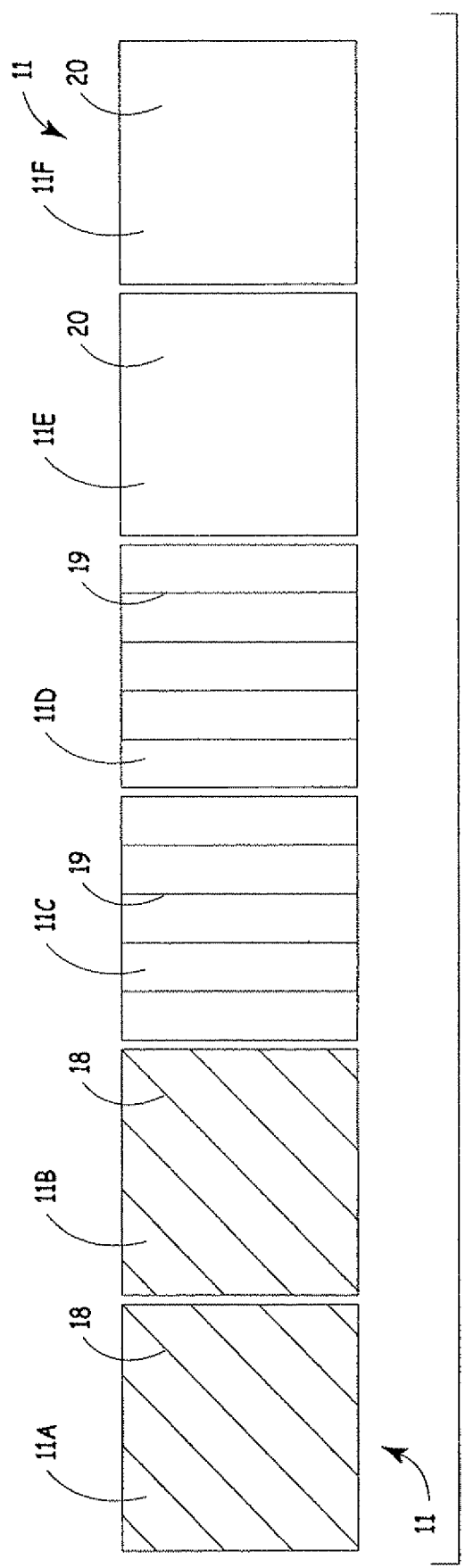

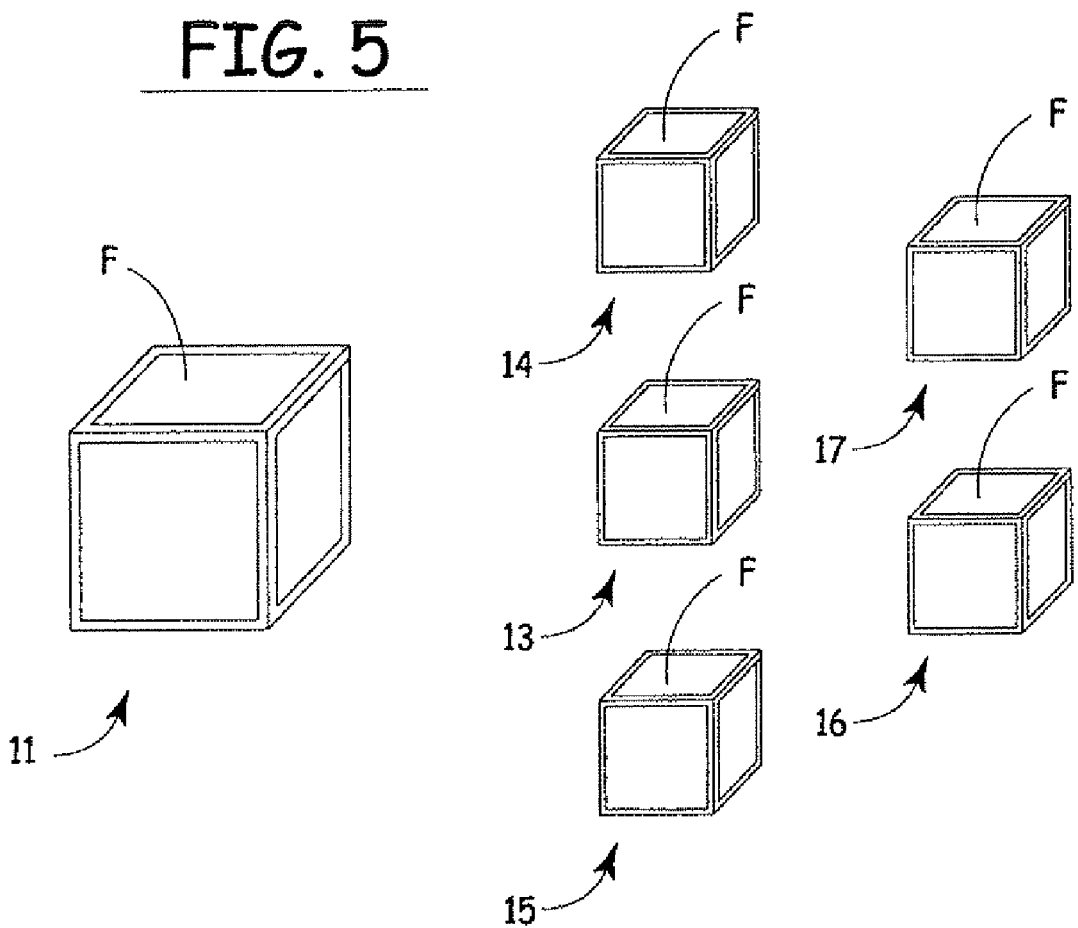

```
nomainwin
    loadbmp "backgd", "bankbust3.bmp"                          bankbust.bas
    diecolor$(1)= "white": diecolor$(2)="blue" :diecolor$(3)="red"
    dieval(1)=1: dieval(2)=1: dieval(3)=1: dieval(4)=2: dieval(5)=2: dieval(6)=3
    WindowWidth = 800
    WindowHeight = 625
    UpperLeftX = 120
    UpperLeftY = 50 open "Guyer's Dice Game" for graphics_nf_nsb as #main print #main, "when characterInput [keyPressed]"
    print #main, "trapclose [quit]"
    longest=0
    credits=50
 [gamestart]
  gamestart=0
  turn =0
  total=0
  print #main, "drawbmp backgd 0, 0"
  print #main, "backcolor 128 192 192; color blue; up; goto 690 170; down; font
showcard_gothic 10"
    print #main, "up; goto 250 395; down; backcolor 0 0 128; color white; font
showcard_gothic 24"
    cred$ = using ("######.##", credits)
    print #main, "\";cred$
    total = total + turn
    if total>longest then longest = total
    print #main, "up ; goto 590 390 ; down ; backcolor yellow; boxfilled ";680;"
";440
    print #main, "up ; goto 590 440 ; down ; backcolor red; boxfilled ";680;"
";490
    print #main, "up ; goto 590 490 ; down ; backcolor blue; boxfilled ";680;"
";540
    print #main, "up ; goto "; 655-12*len(str$(turn));" ";427;"; down; backcolor
yellow ; color blue; font showcard_gothic 20 " : print #main, "\";turn
    print #main, "up ; goto "; 655-12*len(str$(total));" ";477;"; down;
backcolor red ; color yellow; font showcard_gothic 20 " : print #main, "\";total
    print #main, "up ; goto "; 655-12*len(str$(longest));" ";527;"; down;
backcolor blue ; color white; font showcard_gothic 20 " : print #main,
"\";longest

[loop]
    print #main, "setfocus"
    scan
    goto [loop]

[keyPressed]
    key$ = Inkey$ if key$="q" or key$="Q" then goto [quit]
    if key$="n" or key$="N" and gamestart=0 then goto [newgame]
    if gamestart=0 then goto [loop]
    if key$=" " and bust = 0 then goto [newturn]
    if key$="b" then goto [bank]
```

FIG. 14

```
    goto [loop]

[newgame]
  gamestart=1
  if credits<=0 then credits=50
  total=0
  bet = 3
  credits = credits-3
  total=0
  bust = 0
  print #main, "drawbmp backgd 0, 0"
    print #main, "up; goto 250 395; down; backcolor 0 0 128; color white; font
showcard_gothic 24"
    cred$ = using ("######.##", credits)
    print #main, "\";cred$
      print #main, "up; goto 140 510; down; backcolor 255 255 0; color red;
font showcard_gothic 24"
    bt$ = using ("######.##", bet)
    print #main, "\";bt$
    total = total + turn
      if total>longest then longest = total
  print #main, "up ; goto 590 390 ; down ; backcolor yellow; boxfilled ";680;"
";440
    print #main, "up ; goto 590 440 ; down ; backcolor red; boxfilled ";680;"
";490
    print #main, "up ; goto 590 490 ; down ; backcolor blue; boxfilled ";680;"
";540
    print #main, "up ; goto "; 655-12*len(str$(turn));" ";427;"; down; backcolor
yellow ; color blue; font showcard_gothic 20 " : print #main, "\";turn
    print #main, "up ; goto "; 655-12*len(str$(total));" ";477;"; down;
backcolor red ; color yellow; font showcard_gothic 20 " : print #main, "\";total
    print #main, "up ; goto "; 655-12*len(str$(longest));" ";527;"; down;
backcolor blue ; color white; font showcard_gothic 20 " : print #main,
"\";longest
  goto [loop]

[newturn]
    turn=0
    print #main, "drawbmp backgd 0, 0"
    print #main, "up; goto 250 395; down; backcolor 0 0 128; color white; font
showcard_gothic 30"
    cred$ = using ("######.##", credits)
    print #main, "\";cred$
    print #main, "up; goto 140 510; down; backcolor 255 255 0; color red; font
showcard_gothic 24"
    bt$ = using ("######.##", bet)
    print #main, "\";bt$ turn = 0
    mdie = int(3*rnd(1)+1)

x = 185: y = 235
      print #main, "up ; goto ";x;" ";y;"; down ; backcolor ";diecolor$(mdie);";
boxfilled ";x+50;" ";y+50
      if mdie>1 then print #main, "up ; goto ";x+25;" ";y+25;"; down ; backcolor
yellow"
```

FIG. 15

```
    if mdie=1 then print #main, "up ; goto ";x+25;" ";y+25;"; down ; backcolor
blue"
    print #main, "font showcard_gothic 24"
    print #main, "circlefilled 10"

for i = 1 to 5
    sdie(i)=int(6*rnd(1)+1)
    x = 220+65*i: y = 235 print #main, "up ; goto ";x;" ";y;"; down ; backcolor
";diecolor$(dieval(sdie(i)));"; boxfilled ";x+50;" ";y+50
    if mdie<>dieval(sdie(i)) then [jmp]
    turn=turn+mdie
    if dieval(sdie(i))>1 then print #main, "up ; goto ";x+13;" ";y+37;"; down ;
color yellow"
    if dieval(sdie(i))=1 then print #main, "up ; goto ";x+13;" ";y+37;"; down ;
color blue"
    print #main, "\";mdie

[jmp]
next i
    if turn=0 then [bust]
total=total+turn
if total>longest then longest=total
prize = int(.064*turn * bet*100)/100
    print #main, "up; goto 290 325; down; backcolor 255 255 0; color blue; font
showcard_gothic 24"
    print #main, "\You win $";prize;"!"
bet = bet +prize
    if total>longest then longest = total
 print #main, "up ; goto 590 390 ; down ; backcolor yellow; boxfilled ";680;"
";440
    print #main, "up ; goto 590 440 ; down ; backcolor red; boxfilled ";680;"
";490
    print #main, "up ; goto 590 490 ; down ; backcolor blue; boxfilled ";680;"
";540
    print #main, "up ; goto "; 655-12*len(str$(turn));" ";427;"; down; backcolor
yellow ; color blue; font showcard_gothic 20 " : print #main, "\";turn
    print #main, "up ; goto "; 655-12*len(str$(total));" ";477;"; down;
backcolor red ; color yellow; font showcard_gothic 20 " : print #main, "\";total
    print #main, "up ; goto "; 655-12*len(str$(longest));" ";527;"; down;
backcolor blue ; color white; font showcard_gothic 20 " : print #main,
"\";longest
        print #main, "up; goto 140 510; down; backcolor 255 255 0; color red;
font showcard_gothic 24"
    bt$ = using ("######.##", bet)
    print #main, "\";bt$;" "
goto [loop]

[bank]
credits = credits + bet
bet=0
goto [gamestart]

[bust]
    print #main, "up ; goto 250 360; down ; backcolor red; color yellow"
    print #main, "ellipsefilled 400 200 ; up ; goto 110 395; down"
```

FIG. 16

```
    print #main, "font showcard_gothic 74"
    print #main, "\BUST!"
gamestart = 0
bet = 0
goto [loop]

[quit]

close #main
 end
```

FIG. 17

Bank or Bust Error file

Error log timestamp Monday 03/19/07 12:38:16 PM

Runtime error: File C:\Documents and
Settings\gleiter\Desktop\Recent Desktop\xTom
Guyer\BankorBust\bankbust3.bmp not found.

Error(Exception)>>defaultAction
Error(Exception)>>activateHandler: <anUndefinedObject>
Error(Exception)>>handle
Error(Exception)>>signal
Error class(Exception class)>>signal: <'File C:\Documents an...'>
BasicRunProgram(Object)>>error: <'File C:\Documents an...'>
BasicRunProgram(BasicProgram)>>terminateRun: <anError>
[] in BasicProgram>>errorHandlerBlock
ExceptionHandler>>evaluateResponseBlock: <aBlockClosure> for:
<anError>
[] in ExceptionHandler>>handle:
ProtectedFrameMarker(BlockClosure)>>setUnwind: <aBlockClosure>
BlockClosure>>invisibleEnsure: <aBlockClosure>
ExceptionHandler>>handle: <anError>
ExceptionHandler>>findHandler: <anError>
Error(Exception)>>activateHandler: <anExceptionHandler>
Error(Exception)>>handle
Error(Exception)>>signal
Error class(Exception class)>>signal: <'File C:\Documents an...'>
BasicRunProgram(Object)>>error: <'File C:\Documents an...'>
BasicRunProgram(BasicProgram)>>runError: <'File C:\Documents
an...'>
BasicRunProgram(BasicProgram)>>bmpFromFile: <'C:\Documents and
Set...'>
BasicRunProgram(BasicProgram)>>bmpLoad: <aBasicStringContext>
with: <aBasicStringContext>
[] in BmpLoadCommand>>using:
[] in BasicRunProgram>>begin
ExceptionHandler>>evaluateProtectedBlock: <aBlockClosure>
[] in ExceptionHandler>>activateDuring:
ProtectedFrameMarker(BlockClosure)>>setUnwind: <aBlockClosure>
BlockClosure>>invisibleEnsure: <aBlockClosure>
ExceptionHandler>>activateDuring: <aBlockClosure>
ExceptionHandler class>>handle: <anError class> with:
<aBlockClosure> during: <aBlockClosure>
BlockClosure>>on: <anError class> do: <aBlockClosure>
BasicRunProgram>>begin
BasicRunProgram(BasicProgram)>>run

FIG. 19

```
BasicOnDemandCompiler class>>readTknFile: <aFileStream>
callingProgram: <anUndefinedObject> commandLine: <''>
Basic class>>start
Message>>perform
NotificationManager>>empty
NotificationManager>>runPendingEvents
NotificationManager>>runEventLoop
Message>>perform
Message>>evaluate
Process>>safelyEvaluate: <aMessage>
Process>>evaluate: <aMessage>
```

FIG. 20

```
dim thresh(30),reward(30), daytop(100),weektop(100),monthtop(100)
    for i=1 to 100
      daytop(i)= 10+.6*i
      weektop(i)=30+.8*i
      monthtop(i)=40+1*i
    next i
    listposd=100
    listposw=100
    listposm=100
nomainwin daypot =120
weekpot = 1843
monthpot = 32231 loadbmp "backgd", "streak.bmp"
    loadbmp "bonbkgd", "bonus.bmp"
    diecolor$(1)= "white": diecolor$(2)="blue" :diecolor$(3)="red"
    dieval(1)=1: dieval(2)=1: dieval(3)=1: dieval(4)=2: dieval(5)=2: dieval(6)=3
      for i=1 to 17
      read x: thresh(i)=x
      read y: reward(i)=y
      next i data 7,1,14,2,21,3,28,4,35,5,42,5,50,8,60,8,70,10,80,15,90,20
      data 100,100,120,100,130,150,148,250,168,1000,198,10000
  bonusprize(1)=5:bonusprize(2)=10:bonusprize(3)=20
     WindowWidth = 800
     WindowHeight = 625
     UpperLeftX = 120
     UpperLeftY = 50 open "Guyer's Dice Game" for graphics_nf_nsb as #main print #main, "when characterInput [keyPressed]"
    print #main, "trapclose [quit]"

longest=0
      print #main, "drawbmp backgd 0, 0"
   print #main, "backcolor 128 192 192; color blue; up; goto 690 170; down;
font showcard_gothic 10"
    print #main, "\payouts"
      for i =1 to 17
         if thresh(i)=80 then
           print #main, "color red"
           print #main, "\80   SUPER"
           print #main, "\         SPIN"
           print #main, "color blue"
         else
           print #main, "\";thresh(i);":";reward(i)
         end if next i
    print #main, "up ; goto 210 530; down ; backcolor white; color red"
    print #main, "boxfilled 770 575"
   print #main, "backcolor white; color red; up; goto 220 550; down; font
showcard_gothic 14"
```

FIG. 21

```
    print #main, "\JACKPOTS -     Today:  ";int(daypot);"       Weekly:
";int(weekpot);"    Month:   ";int(monthpot)

credits=20

[newgame]
 if credits<=0 then credits=20
 total=0
 bust = 0
 superspin =0
 print #main, "drawbmp backgd 0, 0"
 print #main, "backcolor 128 192 192; color blue; up; goto 690 170; down; font
showcard_gothic 10"
    print #main, "\payouts"
        for i =1 to 17
          if thresh(i)=80 then
              print #main, "color red"
              print #main, "\80    SUPER"
              print #main, "\          SPIN"
              print #main, "color blue"
          else
              print #main, "\";thresh(i);":";reward(i)
          end if next i
       print #main, "up ; goto 70 490; down ; backcolor yellow; color blue"
     print #main, "boxfilled 190 560 ; up ; goto 90 510; down"
     print #main, "font showcard_gothic 14"
     print #main, "\credits"
     print #main, "up; goto ";130-10*len(str$(credits));" 545; down; font
showcard_gothic 24"
     print #main, "\";credits
     print #main, "up ; goto 210 530; down ; backcolor white; color red"
     print #main, "boxfilled 770 575"
     print #main, "backcolor white; color red; up; goto 220 550; down; font
showcard_gothic 14"
     print #main, "\JACKPOTS -     Today: $";int(daypot);"       Weekly:
$";int(weekpot);"    Month: $";int(monthpot)

[loop]
    print #main, "setfocus"
    scan
    goto [loop]

[keyPressed]
    key$ = Inkey$
    if key$="c" then total = 75: goto [newturn]
    if key$=" " and bust = 0 then goto [newturn]
    if key$="n" or key$="N" then goto [newgame]
    if key$="q" or key$="Q" then goto [quit]
    goto [loop]

[newturn]
    credits=credits-1
    daypot=daypot +.01: weekpot=weekpot+.01: monthpot=monthpot+.01
```

FIG. 22

```
    print #main, "drawbmp backgd 0, 0"
    print #main, "backcolor 128 192 192; color blue; up; goto 690 170; down; font
showcard_gothic 10"
    print #main, "\payouts"
        for i =1 to 17
          print #main, "\";thresh(i);":";reward(i)
        next i
          print #main, "up ; goto 70 490; down ; backcolor yellow; color blue"
    print #main, "boxfilled 190 560 ; up ; goto 90 510; down"
    print #main, "font showcard_gothic 14"
    print #main, "\credits"
    print #main, "up; goto ";130-10*len(str$(credits));" 545; down; font
showcard_gothic 24"
    print #main, "\";credits
    print #main, "up ; goto 210 530; down ; backcolor white; color red"
    print #main, "boxfilled 770 575"
    print #main, "backcolor white; color red; up; goto 220 550; down; font
showcard_gothic 14"
    print #main, "\JACKPOTS -      Today: $";int(daypot);"    Weekly:
$";int(weekpot);"    Month: $";int(monthpot)

turn = 0
    mdie = int(3*rnd(1)+1)

x = 185: y = 235
    print #main, "up ; goto ";x;" ";y;"; down ; backcolor ";diecolor$(mdie);";
boxfilled ";x+50;" ";y+50
    if mdie>1 then print #main, "up ; goto ";x+25;" ";y+25;"; down ; backcolor
yellow"
    if mdie=1 then print #main, "up ; goto ";x+25;" ";y+25;"; down ; backcolor
blue"
    print #main, "font showcard_gothic 24"
    print #main, "circlefilled 10"

for i = 1 to 5
    sdie(i)=int(6*rnd(1)+1)
    x = 220+65*i: y = 235 print #main, "up ; goto ";x;" ";y;"; down ; backcolor
";diecolor$(dieval(sdie(i)));"; boxfilled ";x+50;" ";y+50
    if mdie<>dieval(sdie(i)) then [jmp]
    turn=turn+mdie
    if dieval(sdie(i))>1 then print #main, "up ; goto ";x+13;" ";y+37;"; down ;
color yellow"
    if dieval(sdie(i))=1 then print #main, "up ; goto ";x+13;" ";y+37;"; down ;
color blue"
    print #main, "\";mdie

[jmp]
next i
    total = total + turn
    if total>longest then longest = total
    print #main, "up ; goto 580 380 ; down ; backcolor yellow; boxfilled ";670;"
";430
```

FIG. 23

```
    print #main, "up ; goto 580 430 ; down ; backcolor red; boxfilled ";670;"
";480
    print #main, "up ; goto 580 480 ; down ; backcolor blue; boxfilled ";670;"
";530
    print #main, "up ; goto "; 645-12*len(str$(turn));" ";417;"; down; backcolor
yellow ; color blue " : print #main, "\";turn
    print #main, "up ; goto "; 645-12*len(str$(total));" ";467;"; down;
backcolor red ; color yellow " : print #main, "\";total
    print #main, "up ; goto "; 645-12*len(str$(longest));" ";517;"; down;
backcolor blue ; color white " : print #main, "\";longest
    if turn=0 then [bust]
    if longest<daytop(1) then goto [backatit]
  for i=1 to 100
    if longest>daytop(i) then listposd=101-i
    next i
if longest<weektop(1) goto [backatit]
  for i=1 to 100
    if longest>weektop(i) then listposw=101-i
    next i
if longest<monthtop(1) goto [backatit]
  for i=1 to 100
    if longest>monthtop(i) then listposm=101-i
    next i
    [backatit]
    print #main, "backcolor white; color white; up; goto 340 572; down; boxfilled
768 552"

print #main, "backcolor white; color black; up; goto 370 570; down; font
showcard_gothic 14"
    print #main, "\RANK: ";listposd;"        RANK: ";listposw;"
RANK: ";listposm;

for i=1 to 17
     if (total<thresh(i) or oldtotal>=thresh(i)) then [nobonus]
       print #main, "up ; goto 170 420; down ; backcolor white; color blue"
       print #main, "ellipsefilled 250 125 ; up ; goto 90 440; down"
       print #main, "font showcard_gothic 34"
       print #main, "\BONUS!":for k=1 to 80000:next k
     for j=1 to reward(i)
     credits=credits+1
     print #main, "up ; goto 70 490; down ; backcolor yellow; color blue"
     print #main, "boxfilled 190 560 ; up ; goto 90 510; down"
     print #main, "font showcard_gothic 14"
     print #main, "\credits"
     print #main, "up; goto ";130-10*len(str$(credits));" 545; down; font
showcard_gothic 24"
     print #main, "\";credits
     next j
     [nobonus]
    next i
    print #main, "up ; goto 45 355; down ; backcolor 128 192 192; color 128 192
192"
    print #main, "boxfilled 297 484"
    oldtotal=total
if (superspin=1 or total<80) then goto [loop]
    superspin=1
```

FIG. 24

```
superprize=0:prizecount=0
print #main, "drawbmp bonbkgd 0, 0"
print #main, "backcolor 94 227 8; color black; up; goto 530 80; down; font
showcard_gothic 18"
print #main, "\All White:  $";int(daypot)
print #main, "\All Blue:   $";int(weekpot)
print #main, "\All Red:    $";int(monthpot)

for k=1 to 300000:next k mdie = int(3*rnd(1)+1)

x = 185: y = 235
print #main, "up ; goto ";x;" ";y;"; down ; backcolor ";diecolor$(mdie);";
boxfilled ";x+50;" ";y+50
if mdie>1 then print #main, "up ; goto ";x+25;" ";y+25;"; down ; backcolor
yellow"
if mdie=1 then print #main, "up ; goto ";x+25;" ";y+25;"; down ; backcolor
blue"
print #main, "font showcard_gothic 24"
print #main, "circlefilled 10"

for i = 1 to 5
    sdie(i)=int(6*rnd(1)+1)
    x = 220+65*i: y = 235
    for k=1 to 300000:next k print #main, "up ; goto ";x;" ";y;"; down ; backcolor
";diecolor$(dieval(sdie(i)));"; boxfilled ";x+50;" ";y+50
    if mdie<>dieval(sdie(i)) then [hop]
    turn=turn+mdie
    if dieval(sdie(i))>1 then print #main, "up ; goto ";x+10;" ";y+37;"; down ;
color yellow"
    if dieval(sdie(i))=1 then print #main, "up ; goto ";x+16;" ";y+37;"; down ;
color blue"
    print #main, "\";bonusprize(mdie)
    prizecount=prizecount+1
    superprize=superprize+bonusprize(mdie)
    [hop]
    next i
    for k=1 to 300000:next k
    if prizecount<5 then goto [nojackpot]
        superprize = jackpot(sdie)
        for i = 1 to 10
            print #main, "up ; goto 25 25; backcolor white; color blue; boxfilled
580 400"
            print #main, "up ; goto 182 302; down; font showcard_gothic 74"
            print #main, "\JACKPOT!"
            for k=1 to 80000:next k
            print #main, "up ; goto 25 25; backcolor blue; color white; boxfilled
580 400"
            print #main, "up ; goto 182 302; down; font showcard_gothic 74"
            print #main, "\JACKPOT!"
            for k=1 to 80000:next k
        next i
        total =total + superprize
```

FIG. 25

```
        jackpot(sdie)=1
 [nojackpot]
         print #main, "drawbmp bonbkgd 0, 0"
   print #main, "backcolor 94 227 8; color black; up; goto 530 80; down; font
 showcard_gothic 18"
   print #main, "\All White: $";int(daypot)
   print #main, "\All Blue:  $";int(weekpot)
   print #main, "\All Red:   $";int(monthpot)
         print #main, "up ; goto 173 200; backcolor yellow; color yellow; down ;
 boxfilled 665 330"
         print #main, "up ; goto 212 282; down; color blue; font showcard_gothic
 30"
 if superprize>0 then print #main, "\You won ";superprize;" credits!"
 if superprize=0 then print #main, "\   No $$$ this time!"
         credits=credits+superprize
         for k=1 to 120000:next k goto [loop]

[bust]
     print #main, "up ; goto 250 360; down ; backcolor red; color yellow"
     print #main, "ellipsefilled 400 200 ; up ; goto 110 395; down"
     print #main, "font showcard_gothic 74"
     print #main, "\BUST!"
     bust = 1
 goto [loop]

[quit]
 'stopmidi
 close #main
  end
```

FIG. 26

VIRTUAL GAME

CROSS-REFERENCE TO RELATED APPLICATION

The present application is a continuation-in-part of and claims priority to U.S. patent application Ser. No. 10/928,459, filed Aug. 27, 2004 (now U.S. Pat. No. 7,401,782), the content of which is hereby incorporated by reference in its entirety, and which also claimed the benefit of U.S. provisional patent application Ser. No. 60/498,130, filed Aug. 27, 2003; and (2) U.S. provisional patent application Ser. No. 60/920,441, filed Mar. 28, 2007, the content of which is hereby incorporated by reference in its entirety.

BACKGROUND

The present invention relates generally to a method for playing a game of chance and entertainment. More specifically, to a game that uses a relationship between a master indicator and several scoring indicators to determine a player's score.

Games of chance and entertainment exist in a variety of forms. The gambling industry, namely casinos, offers players several gaming options. These options however, are often elaborate games involving complex rules and requiring special tables or machines. Players therefore are unable to reenact the excitement in private without sufficient expense.

There also exists several games for a player to play in private, either alone or with other players. These games however, are often exceedingly simple and do not offer the player a significant level of risk or excitement. Therefore these games are unable to consistently offer the player a desired level of entertainment.

SUMMARY OF THE INVENTION

According to one embodiment, a gaming method includes repetitive plays simulating rolls of virtual dice by a player and at least one of a bonus feature and a progressive feature. According to another embodiment, a gaming method includes scoring dice.

BRIEF DESCRIPTION OF THE DRAWINGS

FIG. 2A is a generated view of each of the six sides and accompanying indicia of a master die of a first embodiment.

FIG. 2B is a generated view of each of the six sides and accompanying indicia of a scoring die of a first embodiment.

FIG. 3A is a generated view of each of the six sides and accompanying is indicia of a master die of a second embodiment.

FIG. 3B is a generated view of each of the six sides and accompanying indicia of a scoring die of a second embodiment.

FIG. 4A is a generated view of each of the six sides and accompanying indicia of a master die of a third embodiment.

FIG. 4B is a generated view of each of the six sides and accompanying indicia of a scoring die of a third embodiment.

FIG. 5 is a perspective view of a kit of parts used for playing a game of the current invention.

FIGS. 14-17 illustrate a program listing "bankbust.bas" for use in a virtual game.

FIGS. 19-20 illustrate a list of the file "error" in the list of FIG. 18 for use in a virtual game.

FIGS. 21-26 illustrate a program listing "superspin at 80.bas" for use in a virtual game.

DETAILED DESCRIPTION OF ILLUSTRATIVE EMBODIMENTS

As disclosed in FIGS. 1-9 below, a method comprises a step of providing a plurality of scoring dice having a plurality of score value designations and a plurality of master designations and providing a master die having one or more master designations corresponding to the plurality of master designations on the plurality of scoring dice. The method comprises designating a non zero shake score where during a player's turn the player receives at least one master type from the plurality of scoring dice that matches the master type on the master die. s The method comprises designating a zero value shake score if during the player's turn none of the master types on the plurality of scoring dice matches the master type on the master die. The method comprises determining a shake score for one or more players during the player's turn by identifying the plurality of scoring dice that have the same master type as the master type of the master die and calculating the shake score based upon the score value designations on the plurality of scoring dice having the same master type as the master die.

As disclosed in FIGS. 1-28 below, A virtual gaming method, comprises repetitive plays simulating rolls of virtual dice by a player. The virtual game comprises at least one of a bonus feature and a progressive feature. According to one aspect, the bonus feature comprises an option in the game so that, after each successful roll of the virtual dice, the player can either select to make the next roll as usual, or to make the next roll by risking the winnings of a previous play on the next play, or to cash out.

Figure 1:
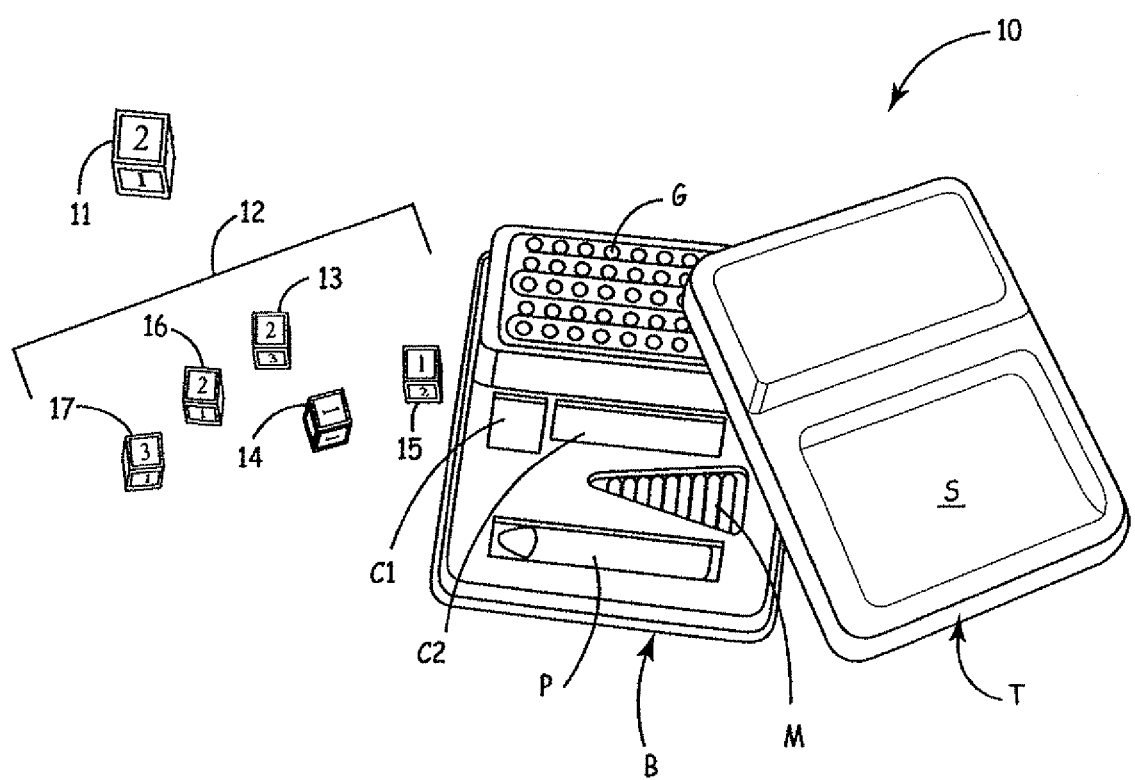
FIG. 1 is a perspective view of a first embodiment of a kit for use in playing a game of the present invention.

FIG. 1 is a perspective view of a kit of playing pieces 10 for playing a game of the present invention. The pieces used in one embodiment of a game of the present invention comprise one master die 11 and a plurality of scoring dice 12. As illustrated in FIG. 1, this embodiment of the game has five scoring dice 13, 14, 15, 16, and 17; however, any number of scoring dice 12 may be used. In the method of the present invention, master die 11 and scoring dice 12 are used in combination to determine a player's score. As illustrated in FIG. 1, the kit may also include a container for the dice 11 and 12. In one embodiment, the container has a base B and a top T, which mate with each other to retain the dice 11 and 12 therein for packaging, storage, travel, etc. The master die 11 and scoring dice 12 may be retained in especially formed cavities C1 and C2 in the base B, and the base B may also include a scoring member or peg M and member holding grid G, for use in keeping score during a player's turn. The base B may also retain a marker P (e.g., a pencil) and the top T may have a surface S for retaining a score sheet or pad for using in keeping score during play of the game.

FIG. 2A is a generated view of a first embodiment of master die 11. In this embodiment, master die 11 has six master sides, shown as sides 11A-11F, and three indicia or master value designations 18, 19, and 20. As illustrated in FIG. 2A, master value designations 18, 19, and 20 are each borne on two of the six master sides 11A-11F. Master value designation 18 is borne on master sides 11A and 11B, master value designation 19 is borne on master sides 11C and 11D, and master value designation 20 is borne on master sides 11E and 11F. In this embodiment, master value designations 18, 19, and 20 are in the form of different colors (e.g., red, blue, and white). In further embodiments, master value designations 18, 19, and 20 can be represented as numbers, patterns, letters, or the like, and/or combinations thereof. FIG. 2A shows master die 11 having six master sides; however, a master die having any number of master sides may be used. In one embodiment, when X number of master sides is used, the number of master value designations is half the number of total master sides. Each master value designation is borne on two of the X master sides. In a further embodiment, master die 11 is visually distinguishable, through size, color, and/or the number of sides, or the like, from each of the scoring dice 12.

FIG. 2B shows a generated view of the first embodiment of die 13 of the plurality of scoring dice 12 illustrated in FIG. 1. In one embodiment, each scoring die 13, 14, 15, 16, and 17 of FIG. 1 is identical. As illustrated in FIG. 2B, scoring die 13 has six scoring sides 13A-13F, and six score value designations 21, 22, 24, 26, 28, and 30. As illustrated, each scoring side 13A-13F contains indicia such as two score value designation 21, 22, 24, 26, 28, and 30: scoring side 13A bears score value designations 21 and 26; scoring sides 13B and 13C bear score value designations 22 and 28; scoring sides 13D, 13E, and 13F bear score value designations 24 and 30. In this embodiment, score value designations 21, 22, and 24 correspond to master die 11 such that, score value designation 21 is equivalent to master value designation 18, score value designation 22 is equivalent to master value designation 19, and score value designation 24 is equivalent to master value designation 20. Further in this embodiment, score value designations 26, 28, and 30 are in the form of the numbers one, two, and three, respectively, as illustrated.

In this embodiment, score value designations 21, 22, and 24 are in the form of different colors; however, as noted above with respect to master value designations 18, 19, and 20 of master die 11, other forms of indicia may be used, such as, for example, numbers, patterns, letters, etc., and/or combinations thereof. Additionally, FIG. 2B shows die 13 of the plurality of scoring dice 12 having six scoring sides; however in other embodiments each scoring die 12 may have any number of scoring sides. The number of sides on each scoring die 12 does not necessarily have to be the same number of sides on master die 11.

FIG. 3A shows a generated view of a second embodiment of a six-sided master die 11 where each master side 11A-11F bears one master value designation 32, 34, and 36. As illus- trated, each master value designation is borne on two of the six master sides of master die 11.

FIG. 3B shows a generated view of scoring sides 13A-13F of die 13 of the plurality of scoring dice 12 corresponding to master die 11 of FIG. 3A. As illustrated, score value designation 26 is borne on scoring side 13A, score value designation 28 is borne on scoring sides 13B and 13C, and score value designation 30 is borne on scoring sides 13D, 13E, and 13F. Score value designation 26 corresponds to master value designation 32. Score value designation 28 corresponds to master value designation 34. Score value designation 30 corresponds to master value designation 36.

FIG. 4A shows a generated view of a third embodiment of a six-sided master die 11 where each of master sides 11A-11F bears one of master value designations 18, 19, and 20. As illustrated, each master value designation is borne on two of the six master sides of master die 11.

FIG. 4B shows a generated view of scoring sides 13A-13F of die 13 of the plurality of scoring dice 12 corresponding to master die 11 of FIG. 4A. As illustrated, score value designation 21 is borne on scoring side 13A, score value designation 22 is borne on scoring sides 13B and 13C, and score value designation 24 is borne on scoring sides 13D, 13E, and 13F. Score value designation 21 corresponds to master value designation 18. Score value designation 22 corresponds to master value designation 19. Score value designation 24 corresponds to master value designation 20.

In the first embodiment of the game, the relationship between master die 11 and scoring dice 12 is very important. The first embodiment is played by a plurality of players, and the object of the game is for a player to score more points than any of the opposing players. In this disclosure, a roll, or throw, of all the dice 11, 13, 14, 15, 16, and 17 by a player is called a "shake". A player's turn begins by shaking all scoring dice 13, 14, 15, 16, and 17 and master die 11. FIG. 5 shows all the dice 11, 13, 14, 15, 16, and 17, and their respective upwardly facing sides F after a shake. As is typical with dice games, the upwardly facing side F of each die is the one used for scoring purposes. Points are scored when the indicia on the upwardly facing side F of at least one scoring die 13, 14, 15, 16, and 17 corresponds to the indicia on the upwardly facing side F of master die 11. The game is played by each player alternating turns until the score of one of the players reaches a predetermined winning score, such as fifty or one hundred points.

In each player's turn of the game, that player may take as many shakes of the dice 11, 13, 14, 15, 16, and 17 as desired. To begin a turn, the player shakes all scoring dice 13, 14, 15, 16, and 17 and master die 11. After each shake, a player's score for that shake is calculated based on the number of scoring dice 13, 14, 15, 16, and 17 that have upwardly facing sides F that correspond to master die 11. This score is called a player's shake score. The score in the method of the invention may represent an arbitrary point value, a simulated monetary value, or a real monetary value throughout the various embodiments.

Figure 6:
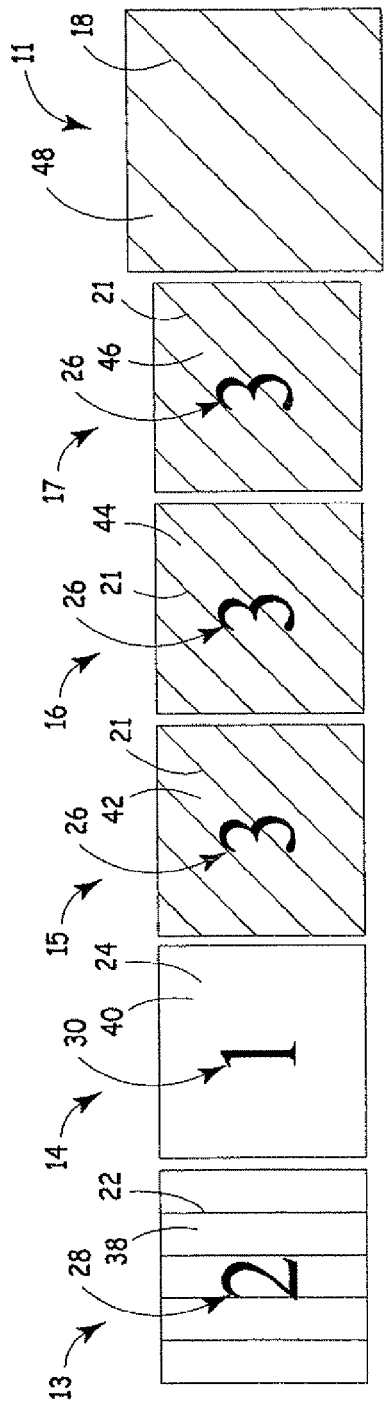
FIG. 6 is an illustration of the results of a shake with a non-zero point value.

FIG. 6 shows an example of the results of a player's shake The upwardly facing scoring side 38, 40, 42, 44, and 46 of each scoring die 13, 14, 15, 16, and 17, respectively, is shown. The upwardly facing master side 48 of master die 11 is also shown. To calculate the shake score for a player, the upwardly facing scoring sides 38, 40, 42, 44, and 46 of each scoring die 13, 14, 15, 16, and 17 is compared to the upwardly facing master side 48 of master die 11. In this embodiment, score value designations 21, 22, and 24 are compared to master value designation 18. Points are awarded for the number of sides between master die 11 and scoring die 13, 14, 15, 16, and 17 which have corresponding value designations.

As illustrated in FIG. 6, upwardly facing scoring side 42 of scoring die 15, upwardly facing scoring side 44 of scoring die 16, and upwardly facing scoring side 46 of scoring die 17 each bear score value designation 21. As also illustrated in FIG. 6, master die 11 bears master value designation 18. As previously discussed, score value designation 21 corresponds to master value designation 18. Therefore, the player will score points for this shake for scoring die 15, scoring die 16, and scoring die 17.

In FIG. 6, upwardly facing scoring sides 42, 44, and 46 of scoring die 15, 16, and 17, respectively, also bear score value designation 26. As illustrated, score value designation 26 is represented as the number three (3). In this embodiment of the game, points are awarded according to the score value designation 26 borne on the same upwardly facing scoring sides 42, 44, and 46 which correspond to master value designation 18 on upwardly facing master side 48 of master die 11. Therefore, this shake would earn the player three (3) points for each upwardly facing scoring side 42, 44, and 46 of scoring dice 15, 16, and 17, for a shake score of nine (9) points (3 points+3 points+3 points=9 points).

Figure 7:
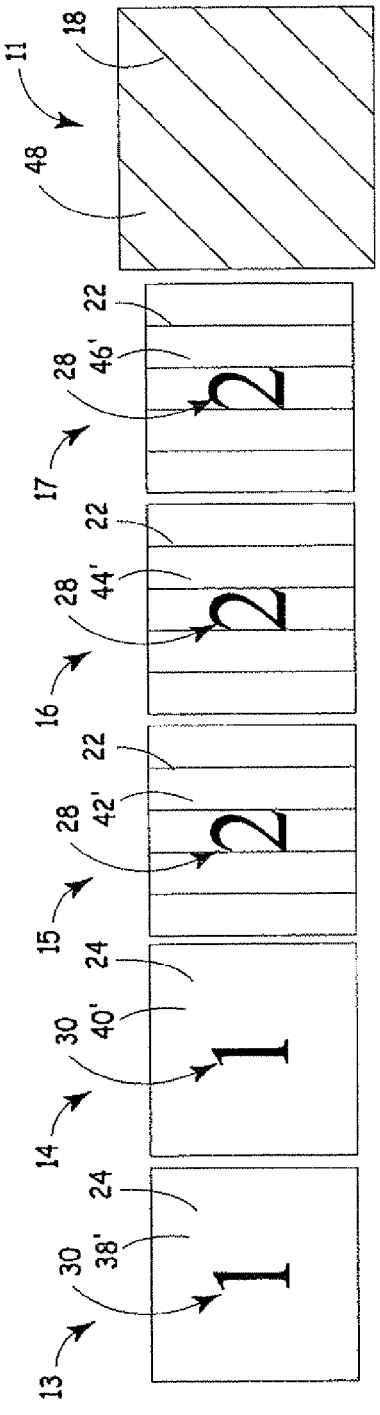
FIG. 7 is an illustration of the results of a shake with a zero point value.

FIG. 7 shows another example of the results of a player's shake. The upwardly facing scoring side 38', 40', 42', 44', and 46' of each scoring die 13, 14, 15, 16, and 17, respectively, is shown. 4The upwardly facing master side 48 of master die 11 is also shown. As illustrated, when master value designation 18 on upwardly facing master side 48 is compared to score value designations 22 and 24 on upwardly facing scoring sides 38', 40', 42', 44', and 46' it can be seen that none are equivalent (i.e., none of the indicia, such as color, on any of upwardly facing scoring sides 38', 40', 42', 44', and 46' of scoring dice 13, 14, 15, 16, and 17 for this shake match the indicia, such as color, on upwardly facing master side 48 of master die 11). Therefore, the player would not earn points from any of scoring dice 13, 14, 15, 16, and 17 from this shake. This is considered a shake of zero-value. In the inventive game, having a shake of zero-value is called being "blanked".

Figure 8:
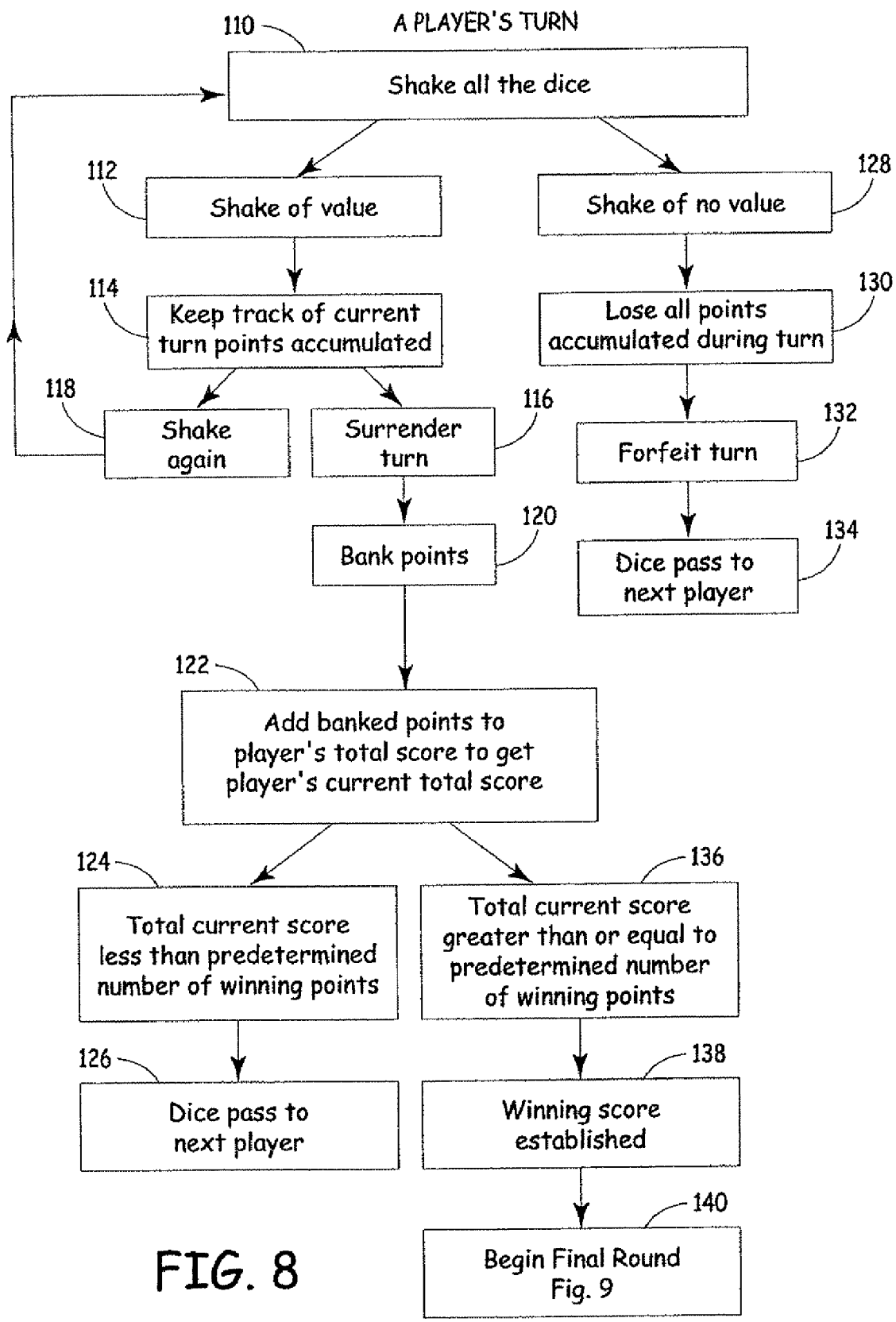
FIG. 8 is a block diagram of a player's turn in one embodiment of the method of playing the game of the current invention.

FIG. 8 is a block diagram of one embodiment of the method of playing a game of the current invention. In this embodiment of the game, a plurality of players compete to achieve a winning number of points. The method of this embodiment creates a game of risk, in that, a player must decide between (1) ending the player's turn, and keeping the player's score, or (2) continuing the player's turn to increase the player's score while risking loss of all the points accumulated during that turn. By continuing a turn, the player is betting the turn score on the hope that the next shake is to have a value greater than zero. Therefore, this embodiment of the method of the present invention rewards a player for streaks of shakes which have a score greater that zero. The play, points and scoring system will be discussed, with reference made to appropriate game pieces previously discussed.

In this embodiment of the game, play begins with a first player beginning a turn. To begin a turn, the first player shakes 110 master die 11 and scoring dice 12. Any points accumulated following the first players shake are accumulated according to the method discussed in FIG. 6 and FIG. 7. If the player's shake results in a shake of value 112 (e.g., nine points as exemplified in FIG. 6) the player will keep track of the number of points earned by that shake 114, and has two options: (1) the player can decide to surrender the turn 116; or (2) the player can decide to shake again 118. If the player chooses to shake again 118 the points earned after each shake are added together 114. However, if a player is satisfied with the number of points the player has accumulated during a turn 110, the player may surrender the turn 116 to the next player.

A player may chose to surrender his turn 116 after any shake of value 112 (i.e., after any shake that has a value greater than zero). Once a player has surrendered the turn, the points accumulated during that turn, called the turn score, are held, or banked 120, by that player and added to that player's previous turn score to compute that player's current total score 122. Once a player has surrendered the turn 116, the player's current total score 122, or accumulation of banked points, will remain with the player until the conclusion of the game. If the player's total score has not reached a predetermined number of winning points 124, then dice 11, 13, 14, 15, 16, and 17 are moved to the next player 126 to begin a turn.

However, if a player is blanked 128 (i.e., a shake having a value of zero as exemplified in FIG. 7) before the player surrenders the turn 116, then the player loses all the points accumulated during that turn 130 and the player's turn is forfeited 132. Once a player is blanked 128, the dice 11, 13, 14, 15, 16, and 17 are moved to the next player 134 to begin a turn. The player who has been blanked 128 does not bank any points from that turn and the player's current total score remains the same as the player's total score at the conclusion of that player's previous turn.

Players continue to alternate turns until one player's current turn score when added to the player's current total score is greater than, or equal to, a predetermined number of winning points 136 (e.g., a winning score of 50 or 100 points). At this time in the player's turn, the player has the same two options: (1) the player can choose to surrender the turn 116 and bank the points accumulated during that turn 120, establish a winning score 138, and possibly win the game, subject to being exceeded by the other players during a final round 140; or (2) the player can choose to continue the turn by shaking again 118 to possibly increase the final score, in effect, making it more difficult for the other players to surpass the player's current total score and win the game. If the player chooses to continue the turn 118, however, and is blanked 128 during that turn, the player loses all the points accumulated during that turn 130 and the turn is forfeited 132. The predetermined winning score 138 would, therefore, not be established for that player's turn.

Figure 9:
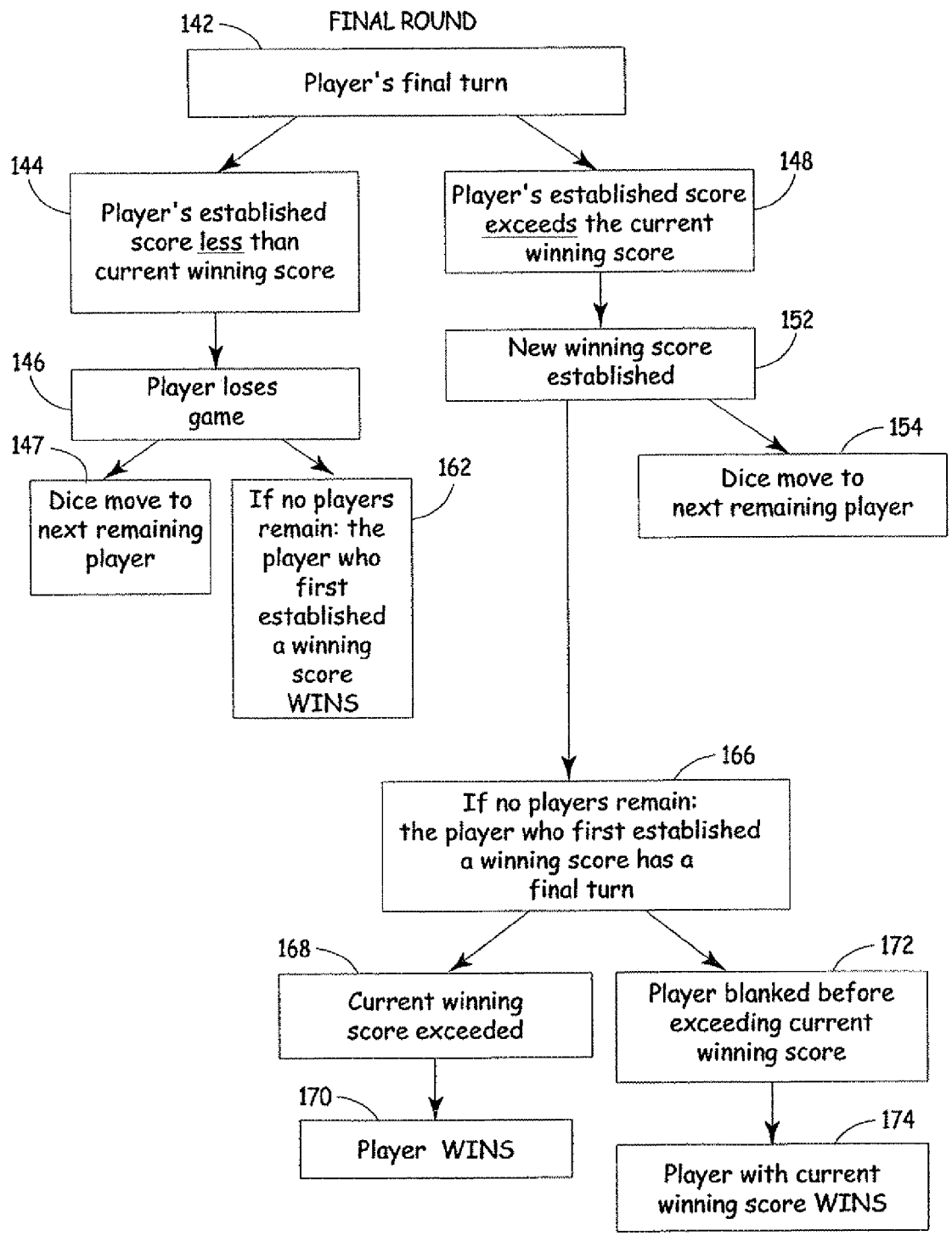
FIG. 9 is a block diagram of the final round of the method of playing the game of the current invention.

In this embodiment, the predetermined winning score is fifty (50) points. When a player's total score of at least fifty (50) points is established 138, the final round begins and each player is allowed one final turn. FIG. 9 is a block diagram of the final round of the game. During the final round turn a player is faced with the same two decisions. (1) to surrender the turn, establish a winning score and possibly win the game; or (2) to continue the turn by shaking again to increase the final score making it more difficult for the remaining players while risking losing all the points accumulated during the turn if the player is blanked.

If, during this final turn 142, a player does not accumulate enough points to exceed the winning score 144, or the player is blanked before surrendering the turn, that player loses the game 146, and the dice pass to the next remaining player 147.

If, however, following a player's final turn 142, the player's established score exceeds the current winning score 148, that player establishes a new winning score 152 and is the current winner.

Following the final round, if no player is able to exceed the original winning score 138, the original player to establish a winning score 138 wins the game 162. However, if a new winning score has been established 152' the player who first established the winning score 138 will then get one last turn 166. If that player is able to exceed 168 the current winning score 152 and surrenders that player's turn before getting blanked, that player wins the game 170. If that player is blanked before exceeding 172 the current winning score 152, the player with the current winning score 152 wins the game 174.

Also in this embodiment, if two or more players exceed fifty (50) points and have identical scores, all of the players, not just the players who have tied, get one more turn during a tie-break round. The player with the highest score at the end of this final round wins.

Another embodiment of the game can be played with one player. In this embodiment, the player successively shakes dice 11, 13, 14, 15, 16, and 17. The player accumulates points based on the outcome of each successive shake according to the previously discussed scoring system. The points that player accumulates after each shake in the turn are summed together. The object of the game is to accumulate the most points during a turn before that player is blanked. Once being blanked, the player begins a new turn and attempts to score higher than the previous turn.

The present invention provides a method of playing a game of chance and entertainment. The game has a plurality of playing pieces, including both a master die and a plurality of scoring dice. In playing a game according to this method, the playing pieces are shaken. During play, all of the playing pieces are thrown during every shake. Each shake results in a score value for that player. Upon completion of a player's turn, the player's score is determined by adding up the points of each shake. Points are awarded based on the corresponding upwardly facing scoring sides and master side, according to a predetermined scoring system. If during a player's turn none of the scoring dice correspond to the master die, the player forfeits the turn and loses all the points accumulated during that turn. Accordingly, the scoring system of the present embodiment rewards a player for having streaks of shakes with value. During each turn, the player may risk all the points the player has accumulated during that turn on the belief that the player will continue the streak and continue to increase the turn score. In the foregoing description of the method of the present invention, the invention has been described with reference to an embodiment which uses a kit of parts containing real, physical dice. However, the method of playing a game according to the present invention in all embodiments disclosed above and their equivalents may be played in a casino with a live dealer using for example, dice or a special set of playing cards, on a video gaming machine, with software on a personal or handheld computer, or with any other machine (e.g., PDA, cell phone, etc.) capable of simulating dice or any other mechanism capable of generating a plurality of random value designations.

In such "virtual" versions of the game, one embodiment involves one or more players competing using a designated playing system. Rather than an s upwardly facing master side (see, e.g., F in FIG. 5) of a physical master die 11, a selected random master value designation is generated on a master indicator. A player begins a turn, by causing or "shaking" the playing system to generate one master value designation from a group of master value designations and at least one score value designation from a group of score value designations. A player's score for that turn is obtained according to a scoring system. The player earns points for each score value designation which corresponds to the master value designation. If no score value designations correspond to the master value designation, the player loses the turn, and the player's score for that turn is zero. The correspondence may be based on matching indicia, or any other detectable correspondence between the master and score value designations.

Once a turn is begun, the player continues to shake until the player surrenders that turn, or the player has a shake of zero-vale. After a shake of zero-value the player's turn is forfeited and the player's turn score is zero. The method of the present invention creates a game of risk, such that, a player must decide between (1) ending the turn, and keeping the current turn score, or (2) continuing the turn to increase the turn score while risking loss of all the points accumulated during that turn. By continuing a turn, the player is betting the turn score on the hope that the next shake is to have a value greater than zero. Therefore, the method of the present invention rewards a player for streaks of shakes which have a score greater that zero.

Figure 10:
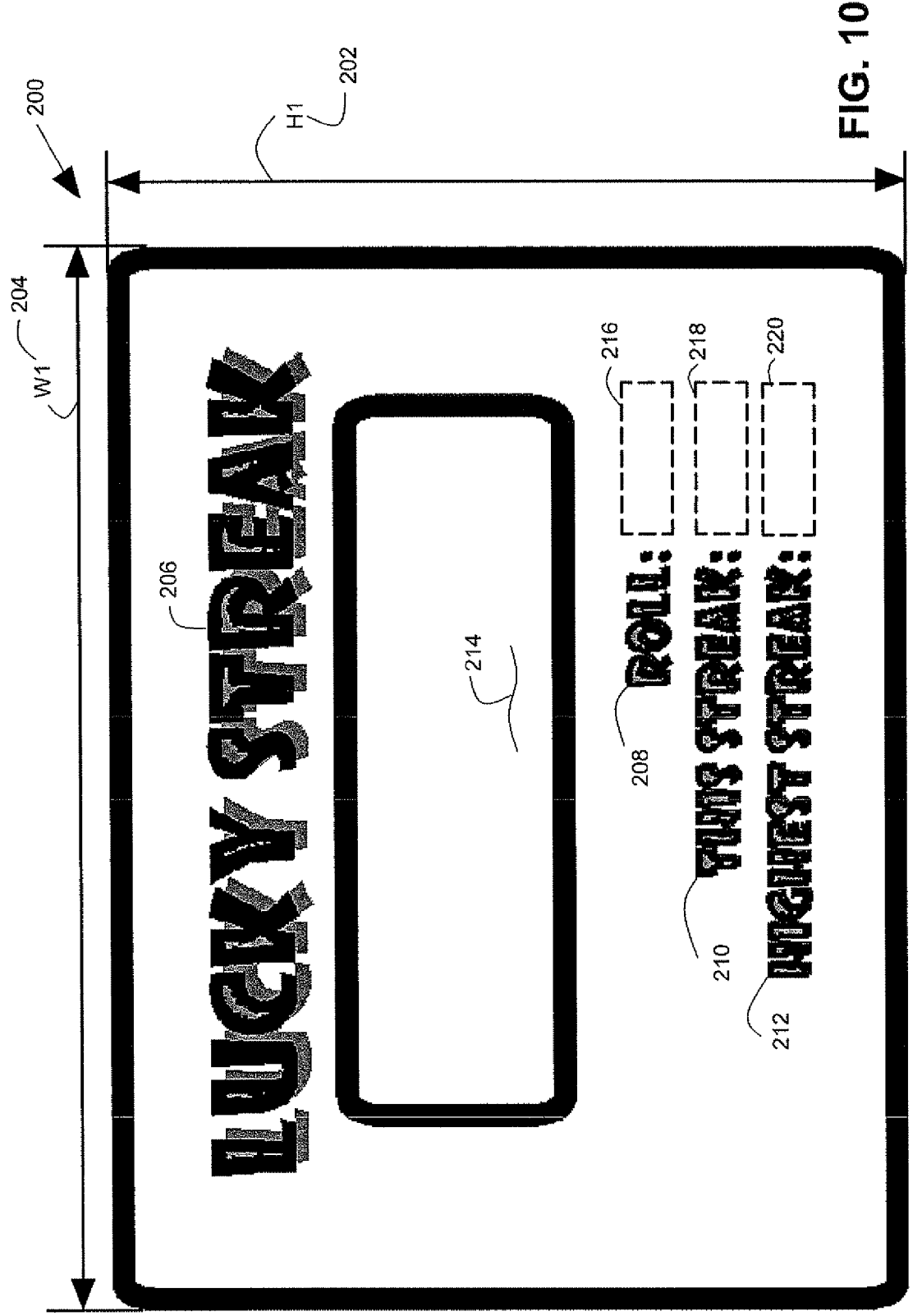
FIG. 10 is a first bitmap image "streak.bmp" for use in virtual game.

FIG. 10 illustrates a first bitmap image 200 which has a computer file name "streak.bmp" for use in virtual game. The first bitmap image 200 comprises an image height H1 202 and an image width W1 204. The first bitmap image 200 comprises an aspect ratio (W1/H1) appropriate to the visual display device used to display the first bitmap image 200. According to one example, the first bitmap image 200 comprises an aspect ratio of 4:3. According to another example, the first bitmap image 200 comprises an aspect ratio of 16:9. Other aspect ratios are also contemplated. The bitmap image 200 is rasterized according the resolution and colorspace of the visual display device.

The first bitmap image 200 comprises written legends "LUCKY STREAK" 206, "ROLL." 208, "THIS STREAK" 210, and "HIGHEST STREAK" 212. The legends 206, 208, 210, 212 have meaning that a user can associate with positive aspects of game playing or progressive winnings in game play. The first bitmap image 200 comprises regions 214, 216, 218, 220 for display of other bitmaps and numerical data which vary as a game is played. The first bitmap image 200 is rasterized on at least a portion of a visual display device. Visual display devices can include gaming devices, computer displays, television displays, cell phone displays, handheld games, or similar visual display devices. A processor, such as a microprocessor, is used to open and rasterize the file "streak.bmp" to drive the visual display device to generate the first bitmap image 200.

Figure 11:
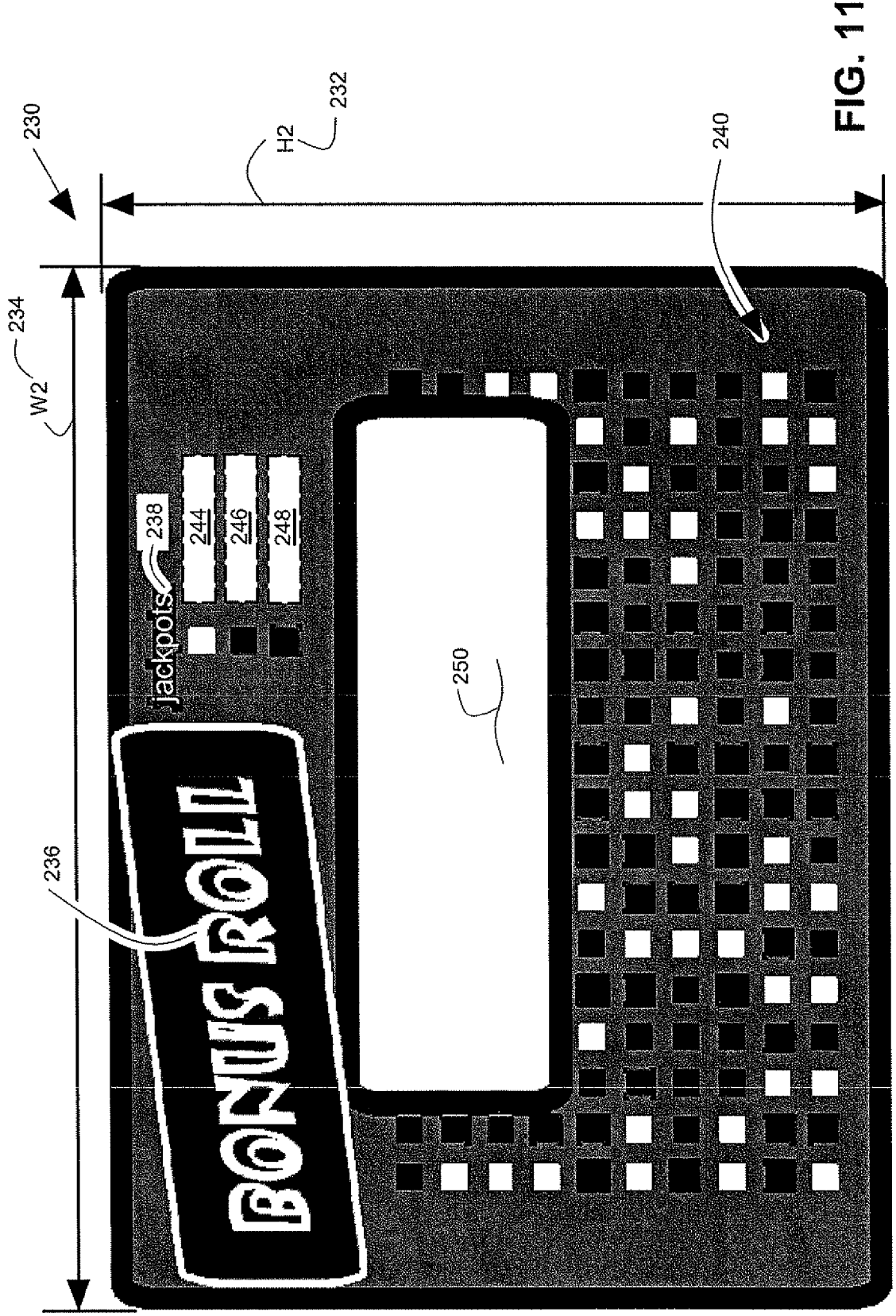
FIG. 11 is a second bitmap image "bonus.bmp" for use in a virtual game.

FIG. 11 illustrates a second bitmap image 230 which has a computer file name "bonus.bmp" for use in virtual game. The second bitmap image 230 comprises an image height H2 232 and an image width W2 234. The second bitmap image 230 comprises an aspect ratio (W2/H2) appropriate to the visual display device used to display the second bitmap image 230. According to one example, the second bitmap image 230 comprises an aspect ratio of 4:3. According to another example, the second bitmap image 230 comprises an aspect ratio of 16:9. Other aspect ratios are also contemplated.

The second bitmap image 230 comprises written legends "BONUS ROLL" 236, "JACKPOTS:" 238, and an array 240 of rectangular square dots of various colors. The legends 236, 238 have meaning that a user can associate with positive aspects of game playing or bonus winnings in game play. The second bitmap image 230 comprises regions 244, 246, 248, 250 for display of other bitmaps and numerical data which vary as a game is played. The second bitmap image 230 is rasterized on at least a portion of a visual display device. Visual display devices can include gaming devices, computer displays, television displays, cell phone displays, handheld games, or similar visual display devices. A processor, such as a microprocessor, is used to open and rasterize the file "bonus.bmp" to drive the visual display device to generate the first bitmap image 200.

Figure 12:
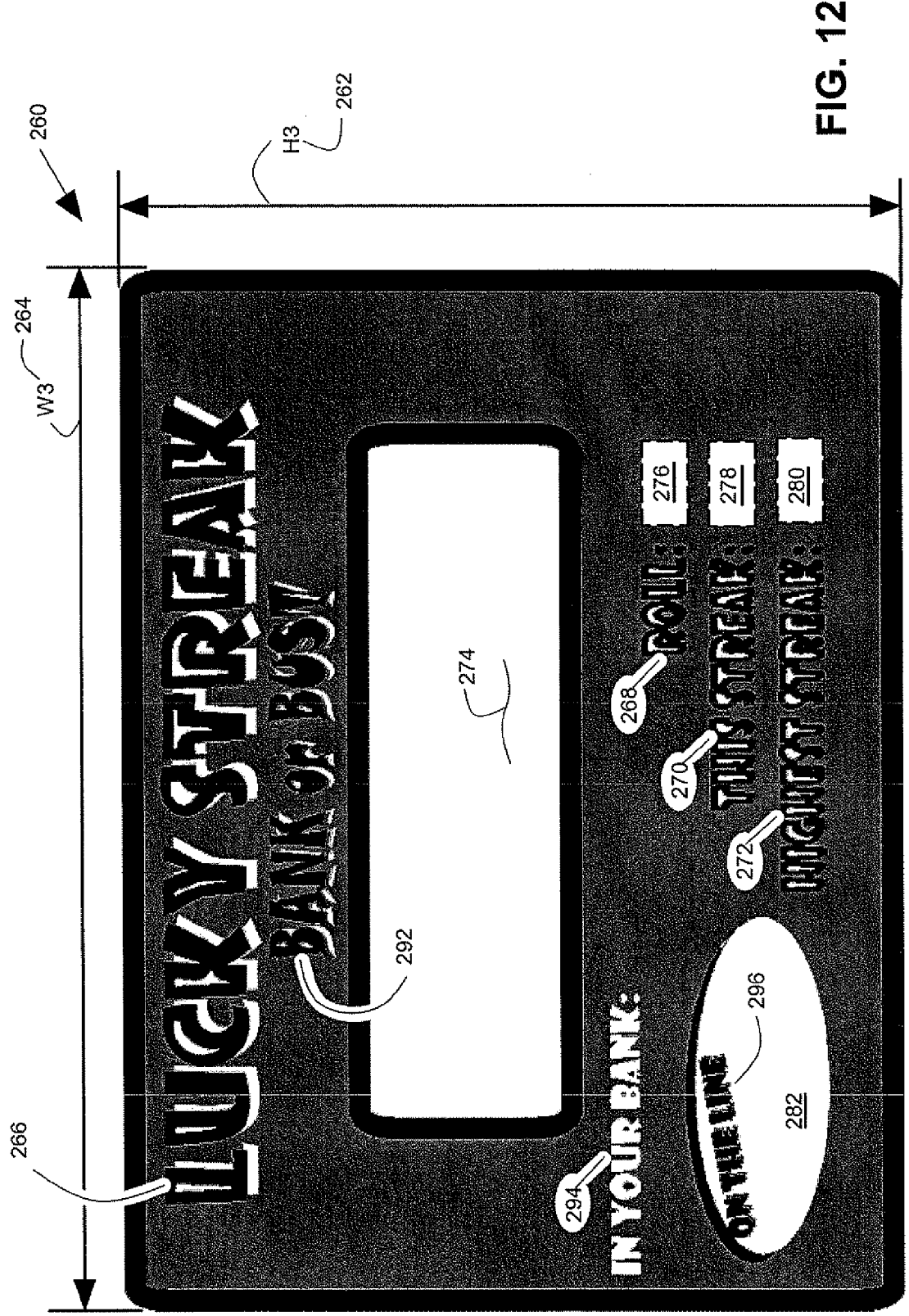
FIG. 12 is a third bitmap image "bankbust.bmp" for use in a virtual game.

FIG. 12 illustrates a third bitmap image 260 which has a computer file name "bankbust.bmp" for use in virtual game. The third bitmap image 260 comprises an image height H3 262 and an image width W3 264. The third bitmap image 260 comprises an aspect ratio (W3/H3) appropriate to the visual display device used to display the first bitmap image 260. According to one example, the first bitmap image 200 comprises an aspect ratio of 4:3. According to another example, the first bitmap image 200 comprises an aspect ratio of 16:9. Other aspect ratios are also contemplated.

The third bitmap image 260 comprises written legends "LUCKY STREAK" 266, "ROLL:" 268, "THIS STREAK" 270, "HIGHEST STREAK" 272, "BANK OR BUST" 292, "IN YOUR BANK" 294, and "ON THE LINE" 296. The legends 266, 268, 270, 272, 292, 294, 296 have meanings that a user can associate with positive aspects of game playing or progressive winnings in game play. The third bitmap image 260 comprises regions 274, 276, 278, 280, 282 for display of other bitmaps and numerical data which vary as a game is played. The third bitmap image 260 is rasterized on at least a portion of a visual display device. Visual display devices can include gaming devices, computer displays, television displays, cell phone displays, handheld games, or similar visual display devices. A processor, such as a microprocessor, is used to open and rasterize the file "bankbust.bmp" to drive the visual display device to generate the third bitmap image 260.

Figure 13:
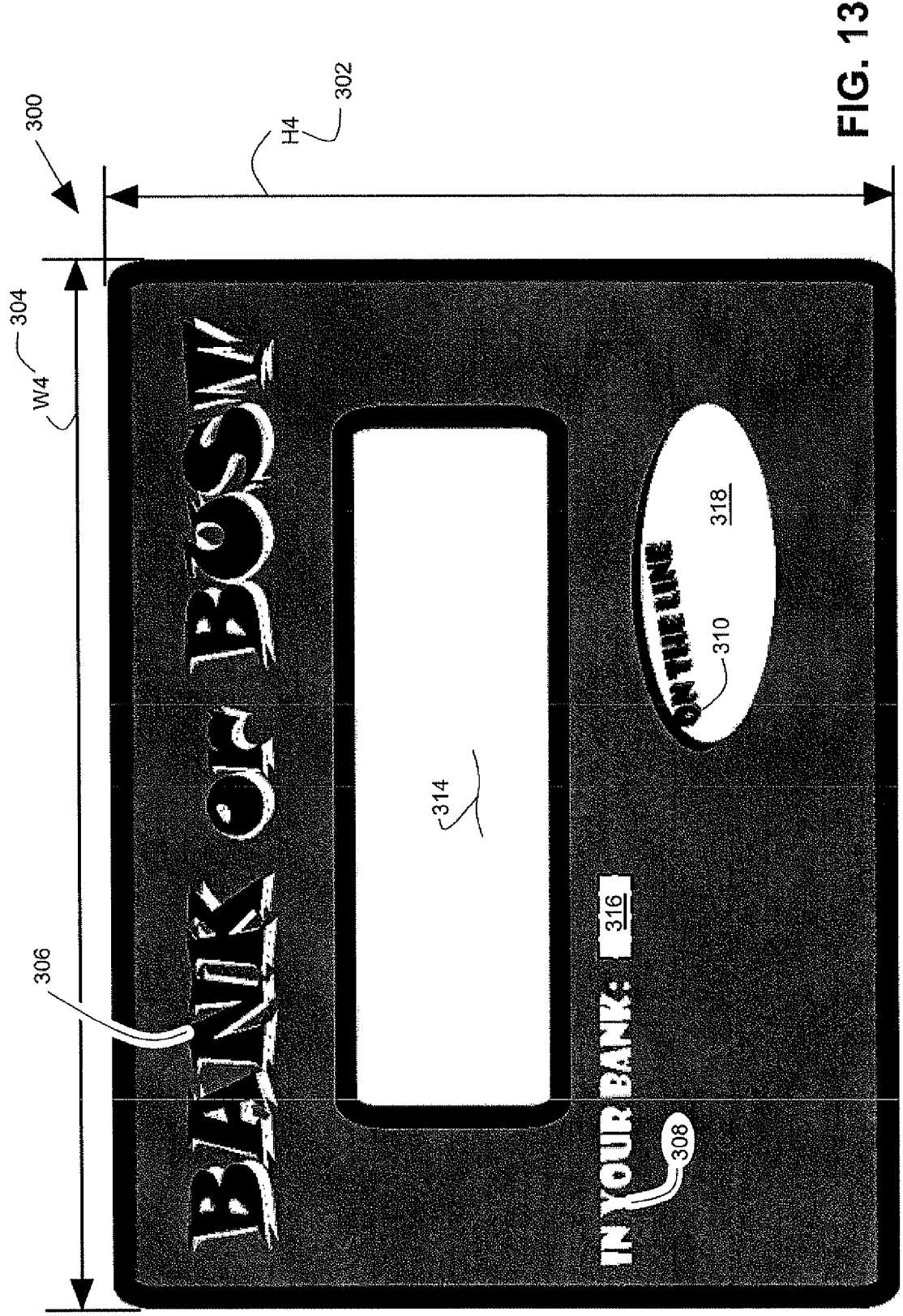
FIG. 13 is a fourth bitmap image "bankorbust.bmp" for use in a virtual game.

FIG. 13 illustrates a fourth bitmap image 300 which has a computer file name "bankorbust.bmp" for use in virtual game. The fourth bitmap image 300 comprises an image height H4 302 and an image width W4 304. The fourth bitmap image 300 comprises an aspect ratio (W4/H4) appropriate to the visual display device used to display the fourth bitmap image 300. According to one example, the fourth bitmap image 300 comprises an aspect ratio of 4:3. According to another example, the fourth bitmap image 300 comprises an aspect ratio of 16:9. Other aspect ratios are also contemplated.

The fourth bitmap image 300 comprises written legends "BANK OR BUST" 306, "IN YOUR BANK:" 308, and "ON THE LINE" 310. The legends 306, 308, and 310 have meanings that a user can associate with positive aspects of game playing or progressive winnings in game play. The fourth bitmap image 300 comprises regions 314, 316, 318 for display of other bitmaps and numerical data which vary as a game is played. The fourth bitmap image 300 is rasterized on at least a portion of a visual display device. Visual display devices can include gaming devices, computer displays, television displays, cell phone displays, handheld games, or similar visual display devices. A processor, such as a microprocessor, is used to open and rasterize the file "streak.bmp" to drive the visual display device to generate the fourth bitmap image 300.

FIGS. 14-17 illustrate sequential portions of a program listing "bankbust.bas" for use in a virtual game. The program listing comprises a sequence of basic language instructions for executing a game that interacts with a user through use of a pointing device (such as a mouse) or a keypad and a visual display device. The program listing "bankbust.bas" is compiled using a basic compiler, and the compiled results are executed by a processor such as a microprocessor. The virtual game interacts with the user by filing in regions for display of other bitmaps and numerical data in at least one of the first, second, third and fourth bitmaps illustrated in FIGS. 10-13.

Figure 18:
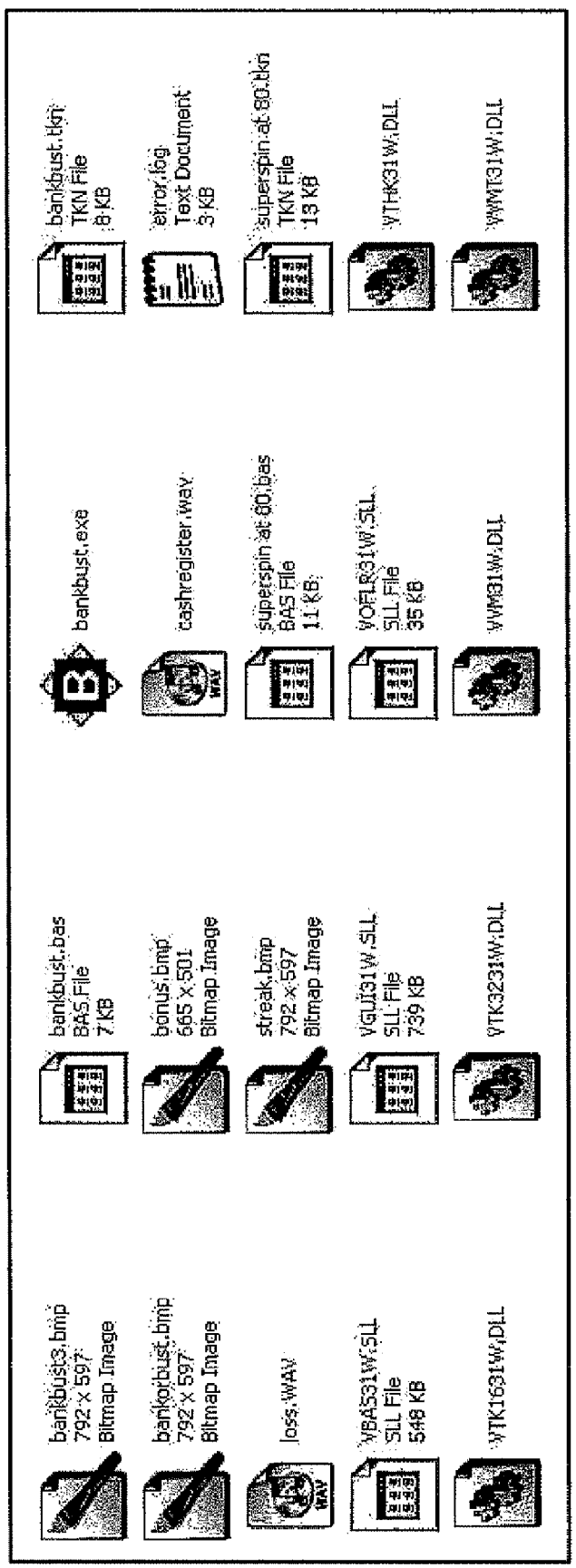
FIG. 18 illustrates a list of files associated with the program listing "bankbust.bas" for use in a virtual game.

FIG. 18 illustrates a list of files associated with the program listing "bankbust.bas" for use in a virtual game. The list of files in FIG. 18 is accessed by the program compiled from basic program "bankbust.bas".

FIGS. 19-20 illustrate sequential portions of a list of the file "error" in the list of FIG. 18 for use in a virtual game. The bankbust.bas program accesses these error instructions when errors occur during program execution.

FIGS. 21-26 illustrate sequential portions of a program listing "superspin at 80.bas" (listed in FIG. 18) for use in the virtual game.

Figure 27:
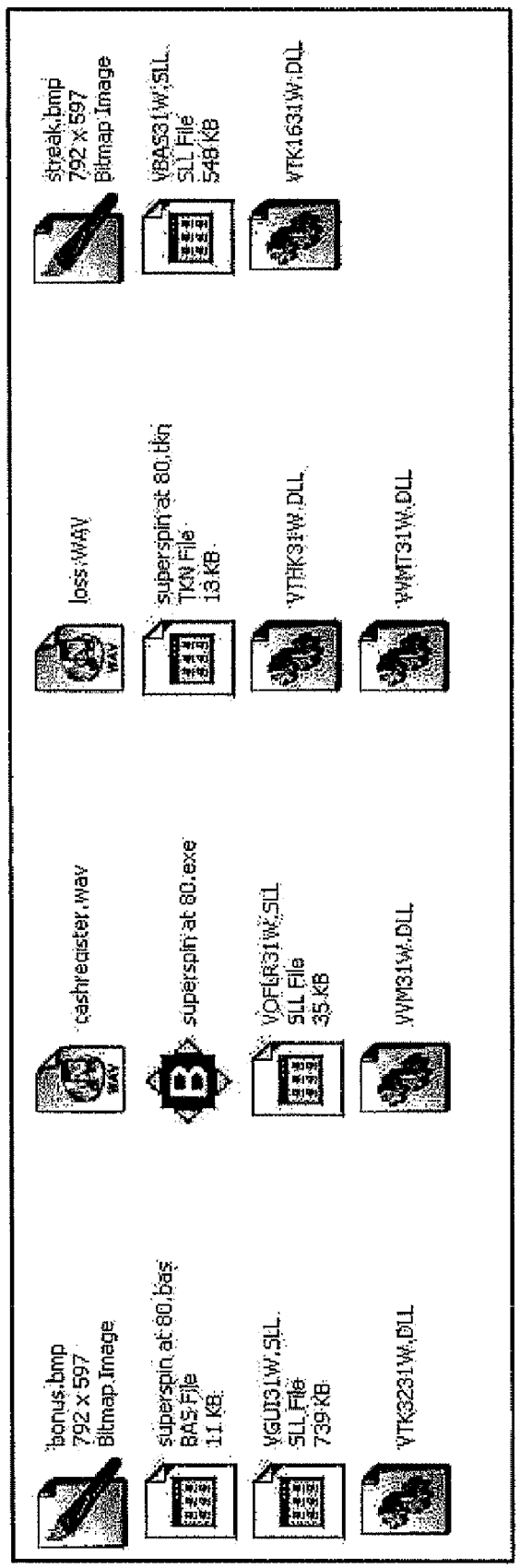
FIG. 27 illustrates a list of files associated with the program listing "superspin at 80.bas" for use in a virtual game.

FIG. 27 illustrates a list of files associated with the program listing "superspin at 80.bas" for use in a virtual game. The list of files in FIG. 27 is accessed by the compiled program "superspin at 80.bas".

Figure 28:
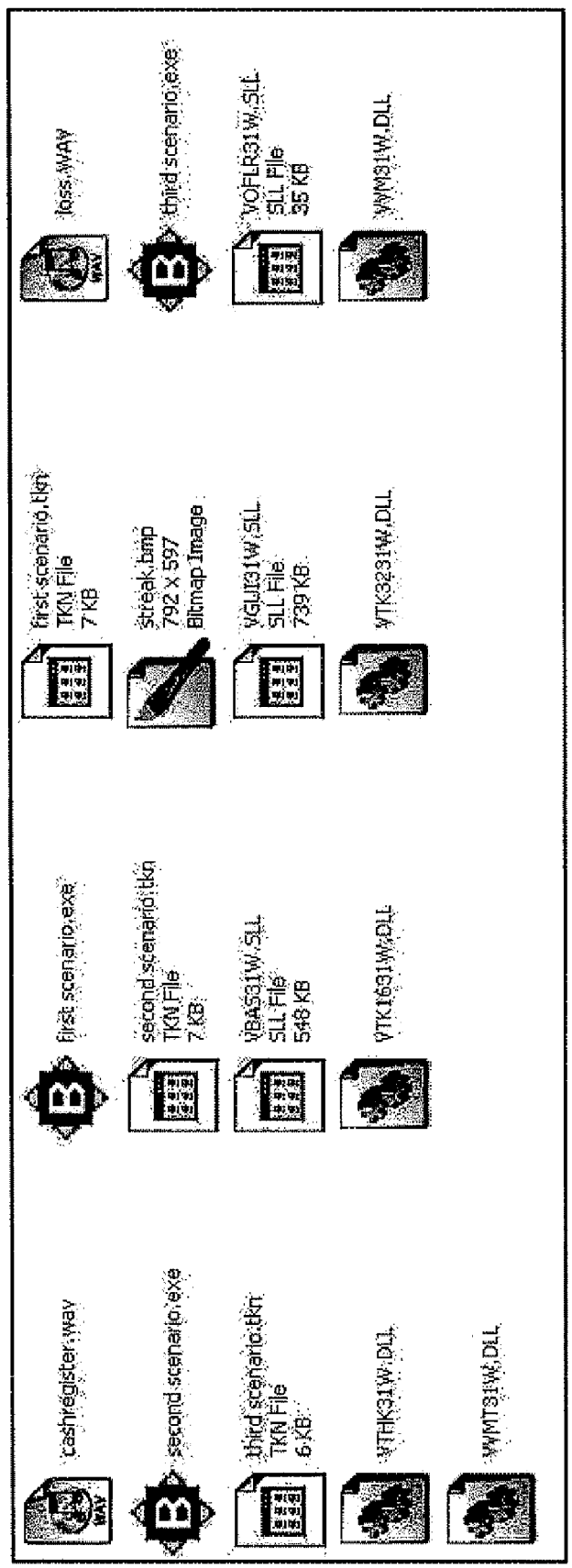
FIG. 28 illustrates a list of files associated with the programs listing "first scenario", "second scenario" and "third scenario" for use in a virtual game.

FIG. 28 illustrates a list of files associated with the program listing "first scenario", "second scenario," and "third scenario" for use in the virtual game. The program listing provides different game scenarios that can be run for gaming operation or testing.

As mentioned above, the games described above in FIGS. 1-9 can be realized as virtual games. In addition to the games described above in FIGS. 1-9, the games described above can be adapted to provide progressive features, bonus features, or both bonus and progressive features and the like as described in FIGS. 10-28 and below. The progressive features, bonus features or both progressive and bonus features can also be adapted to other kinds of games (non dice games) where there are repetitive plays.

The progressive feature comprises an option in the game so that, after each successful roll of virtual dice (or other play in non-dice games), the player can either select to make the next roll (play) as usual, or to make the next roll (play) by risking the winnings of a previous play on the next play, or to cash out. The game can be played with points, virtual monetary amounts or other symbols.

The game with progressive features can be played on an individual machine (computer, cell phone, PDA, casino gambling machine, etc) that is joined in a group of machines. Within the group of machines, points or virtual monetary amounts can be linked together to accumulate bonus points or bonus monetary value in bonuses (at time intervals, for example, such as hour, day, week, month, holiday season, special event, etc.) that can be won on any machine in the group of machines. Progressive play at each machine contributes to the group bonuses, and players at each machine have an opportunity to reach a bonus level (spin at 80, for example) in a game and get an opportunity to play a bonus round to win one of the bonuses. In one embodiment, the play in the bonus round is also progressive play.

The game with progressive features can be played on an individual machine that is used at different times by different users so that bonuses can accumulate and be available for winning by later players.

A player loads a machine with a starting amount, say $50, and uses a portion of that starting amount, say $3, to roll dice (start play). If the play is successful and the player wins money, for example $0.50, then the amount won can be risked on the next roll, namely $3.50, so that the amount won on the next roll, if successful, will be increased. This progressive feature can be exercised one or more times by the player as the game progresses. The progressive feature can permit a player to enjoy an effort to increase winnings during a perceived "streak" of good luck.

In one embodiment, the game is played in turns with multiple players who compete with one another to reach a predetermined winning amount. In another embodiment, after a first player reaches the predetermined winning amount, an additional final ("overtime") round of play is played out so that the other players have a final chance to increase their winnings (or take advantage of a loss of the first player) to become the game winner.

In one embodiment, a long term average amount ("hold") returned by the game to the players is in the range of 90-99% of the amounts risked by the players to provide a large number of wins for the players. The small difference between the amount risked and the hold is retained by the operator of the game.

A virtual game is started by a player putting some money in a pot, which turns into credits of some kind on the machine. The player risks an amount of credit to start play. Winning provides increases in the pot with credits won, or typically fractions of credits won. Losing results in loss of credits that were risked and any credits won in a series of progressive plays up to the point of loss, At the point of loss, game play moves to the next player. At any time during winning play, the player can opt to take the winnings and pass to the next player.

Time delays are inserted into selected parts of the virtual game operation on an heuristic basis to increase enjoyment of the game. Sound effects (generated by sound files or otherwise) are included to increase enjoyment of the game. Visual effects (for example FIGS. 10-13) can be used in combination with changing textual messages and numeric results to increase enjoyment. Odds of winning various pots can be displayed in combination with other visual effects.

The virtual games can be programmable by the operator to select different payouts, visual effects, sound effects, types of credits and the like appropriate for a playing environment.

A certain amount of money can be put in to a player's pot on the machine, for example $50. A play could be started with a smaller amount, for example $3. The start of play reduces the pot to $47. Play can be winning and add to the amount put in the player's pot, or play can be losing and decrease the amount in the pot further. A streak of winning plays can be stopped at any time by the player, and the amount is added to the pot. If a streak ends in a loss, however, then no amount is added to the pot.

Various features described above can be combined with one another to provide the virtual game. Examples of features of various virtual games are illustrated in FIGS. 10-28.

The additional video games can operate in known operating system environments such as Windows XP, Windows Mobile, Apple OS X, Windows Vista, Casino gambling machine, Unix operating environments, PDA operating environments, video game consoles and other known operating environments. Input entries from players can include keystrokes, touch screen entry, mouse, stylus and other pointing device entry. Outputs can be displayed to the player on known video displays. Credits (including monetary credits) can be transferred in and out of the machine electronically, by credit or cash card, by tokens, by cash or other means of transferring credits. Linking between linked machines can be completed by wireless or wired networks, optical communication, singly or in combination, including but not limited to the internet, local area networks, or wide area networks. Winning of players can be credited to individual players, or paid to a single pot in a fund raising event. Tournament play is also contemplated, and the payout may comprise naming a tournament champion or other title. The additional video games can also be used as a research tool for the study of player behavior.

Although the present invention has been described with reference to preferred embodiments, workers skilled in the art will recognize that changes may be made in form and detail without departing from the spirit and scope of the invention.

What is claimed is:

1. A method comprising the steps of:
   providing a plurality of scoring dice having a plurality of score value designations and a plurality of master designations and providing a master die having one or more master designations corresponding to the plurality of master designations on the plurality of scoring dice;
   designating a non-zero shake score where during a player's turn the player receives at least one master designation from the plurality of scoring dice that matches the master designation on the master die;
   designating a zero value shake score if during the player's turn none of the master designations on the plurality of scoring dice matches the master designation on the master die; and
   determining a shake score for one or more players during the player's turn by identifying the plurality of scoring dice that have the same master designation as the master designation of the master die and calculating the shake score based upon the score value designations on the plurality of scoring dice having the same master designation as the master die.

2. The method of claim 1, wherein the master die has a total number of master sides and total number of master designations, wherein the total number of master designations is half the total number of master sides, and wherein each one of the master designations is borne on two master sides.

3. The method of claim 1 and further comprising the steps of designating first, second and third master designations; and
   designating at least three of the first master designation, at least two of the second master designation and one of the third master designation on each of the plurality of scoring dice.

4. The method of claim 1, and further comprising:
   designating one of a first, second, and third master designations on the master die; and
   designating the score value designations on each of the plurality of scoring dice such that each of the plurality of scoring dice includes
      a first score value designation thereon corresponding to the first master designation;
      a second score value designation thereon corresponding to the second master designation; and
      a third score value designation thereon corresponding to the third master designation.

5. The method of claim 1, wherein the step of determining the shake score comprises assigning a point value to each of the plurality of score value designations on the plurality of scoring dice; and
   calculating the shake score based upon the assigned point value for the plurality of score value designations.

6. The method of claim 1, wherein the plurality of master designations and the plurality of score value designations on each of the scoring dice use the same indicia.

7. The method of claim 1 wherein the plurality of score value designations for the plurality of scoring dice have a score value based upon frequency of the one or more master designations on the plurality of scoring dice.

8. A method comprising the steps of:
   designating a non-zero shake score where, during a player's turn, the player receives at least one master designation from at least one of a plurality of scoring dice that matches a master designation on a master die, wherein each scoring die has a plurality of score value designations and a plurality of the master designations, and wherein the master die has one or more master designations corresponding to the plurality of master designations on each of the scoring dice;
   designating a zero value shake score where, during the player's turn, none of the master designations on the plurality of scoring dice matches the master designation on the master die; and
   determining a shake score for one or more players during the player's turn by identifying the plurality of scoring dice that have the same master designation as the master designation of the master die and calculating the shake score based upon the score value designations on the plurality of scoring dice having the master designation as the master die.

9. The method of claim 8, wherein the master die has a total number of master sides and total number of master designations, wherein the total number of master designations is half the total number of master sides, and wherein each one of the master designations is borne on two master sides.

10. The method of claim 8 and further comprising the steps of designating first, second and third master designations; and
   designating at least three of the first master designation, at least two of the second master designation and one of the third master designation on each of the plurality of scoring dice.

11. The method of claim 8, and further comprising:
   designating one of a first, second, and third master designations on the master die; and
   designating the score value designations on each of the plurality of scoring dice such that each of the plurality of scoring dice includes
   a first score value designation thereon corresponding to the first master designation;
   a second score value designation thereon corresponding to the second master designation; and
   a third score value designation thereon corresponding to the third master designation.

12. The method of claim 8, wherein the step of determining the shake score comprises
   assigning a point value to each of the plurality of score value designations on the plurality of scoring dice; and
   calculating the shake score based upon the assigned point value for the plurality of score value designations.

13. The method of claim 8, wherein the plurality of master designations and the plurality of score value designations on each of the scoring dice use the same indicia.

14. The method of claim 8 wherein the plurality of score value designations for the plurality of scoring dice have a score value based upon frequency of the one or more master designations on the plurality of scoring dice.

\* \* \* \* \*

UNITED STATES PATENT AND TRADEMARK OFFICE
CERTIFICATE OF CORRECTION

| | | |
|---|---|---|
| PATENT NO. | : 8,074,985 B2 | Page 1 of 1 |
| APPLICATION NO. | : 12/056957 | |
| DATED | : December 13, 2011 | |
| INVENTOR(S) | : Reynolds Guyer | |

It is certified that error appears in the above-identified patent and that said Letters Patent is hereby corrected as shown below:

Title page, Item (*) "Notice:", the following language should be removed: "This patent is subject to a terminal disclaimer."

Title page, Item (63) "Related U.S. Application Data", the following application should be added: "Provisional application No. 60/498,130, filed on August 27, 2003."

Signed and Sealed this
Nineteenth Day of February, 2013

Teresa Stanek Rea
*Acting Director of the United States Patent and Trademark Office*